US008450446B2

(12) United States Patent
Fontana

(10) Patent No.: US 8,450,446 B2
(45) Date of Patent: May 28, 2013

(54) ROSEN PHENOLIC RESINS AND USES RELATED THERETO

(75) Inventor: Thomas Fontana, Jacksonville, FL (US)

(73) Assignee: Arizona Chemical Company, LLC, Jacksonville, FL (US)

( * ) Notice: Subject to any disclaimer, the term of this patent is extended or adjusted under 35 U.S.C. 154(b) by 148 days.

(21) Appl. No.: 11/845,410

(22) Filed: Aug. 27, 2007

(65) Prior Publication Data
US 2008/0207863 A1    Aug. 28, 2008

Related U.S. Application Data

(63) Continuation of application No. 10/654,661, filed on Sep. 3, 2003, now abandoned, which is a continuation-in-part of application No. 10/384,075, filed on Mar. 5, 2003, now abandoned.

(51) Int. Cl.
C08G 14/04    (2006.01)
C08G 8/12    (2006.01)

(52) U.S. Cl.
USPC ........ 528/129; 528/158.5; 528/159; 528/161; 528/176; 528/195; 528/205; 528/212; 525/54.45; 525/132; 525/133; 525/134; 106/31.13; 106/218; 106/219; 106/236; 106/500

(58) Field of Classification Search
USPC .............. 528/129, 158.5, 159, 161, 176, 195, 528/205, 21, 212; 525/54.45, 132, 133, 134; 106/31.13, 218, 219, 236, 500
See application file for complete search history.

(56) References Cited

U.S. PATENT DOCUMENTS

| | | | |
|---|---|---|---|
| 2,007,983 A | 7/1935 | Rosenblum | |
| 2,101,944 A | 12/1937 | Honel | |
| 2,309,610 A * | 1/1943 | Burrell | 527/602 |
| 2,572,071 A | 10/1951 | St. Clair et al. | |
| 2,750,296 A | 6/1956 | Curado et al. | |
| 2,848,430 A | 8/1958 | Frey et al. | |
| 3,531,302 A | 9/1970 | Horn | |
| 3,674,732 A | 7/1972 | Pitzalis et al. | |
| 3,880,788 A | 4/1975 | Rudolphy | |
| 4,079,102 A | 3/1978 | Wagner et al. | |
| 4,198,329 A | 4/1980 | Rudolphy et al. | |
| 4,391,640 A | 7/1983 | Okoshi et al. | |
| 4,528,036 A | 7/1985 | Rudolphy | |
| 4,552,592 A | 11/1985 | Rudolphy et al. | |
| 4,597,793 A | 7/1986 | Amon et al. | |
| 4,639,492 A | 1/1987 | Makhlouf et al. | |
| 4,725,384 A | 2/1988 | Du Vernet | |
| 4,857,624 A | 8/1989 | DeBlasi et al. | |
| 4,966,945 A | 10/1990 | Drawert et al. | |
| 5,021,538 A | 6/1991 | Crews | |
| 5,096,996 A | 3/1992 | Hesse et al. | |
| 5,405,932 A | 4/1995 | Bender et al. | |
| 5,423,908 A | 6/1995 | Crews et al. | |
| 5,427,612 A | 6/1995 | Bender | |
| 5,498,684 A | 3/1996 | Bender | |
| 5,549,741 A | 8/1996 | Pennaz et al. | |
| 5,556,454 A | 9/1996 | Bender | |
| 5,597,884 A | 1/1997 | Bender | |
| 5,698,668 A | 12/1997 | Bender | |
| 5,708,078 A | 1/1998 | Bender et al. | |
| 5,886,128 A * | 3/1999 | West et al. | 528/158.5 |
| 5,969,071 A | 10/1999 | Matzinger | |
| 6,022,947 A | 2/2000 | Frihart et al. | |
| 6,153,693 A | 11/2000 | Matzinger et al. | |
| 6,172,174 B1 | 1/2001 | Matzinger | |
| 6,469,124 B2 | 10/2002 | Braat et al. | |
| 6,469,125 B1 | 10/2002 | Fontana et al. | |
| 6,875,842 B2 | 4/2005 | Fontana et al. | |
| 2004/0181026 A1 | 9/2004 | Toyoda et al. | |

FOREIGN PATENT DOCUMENTS

| | | |
|---|---|---|
| EP | 0362727 A2 | 4/1990 |
| EP | 0649889 A1 | 4/1995 |
| EP | 0666294 A2 | 8/1995 |
| EP | 0733684 A2 | 9/1996 |
| EP | 0733685 A2 | 9/1996 |
| EP | 0955325 A1 | 11/1999 |
| JP | 62-260810 | 11/1987 |
| JP | 09-169912 | 6/1997 |
| WO | 98/58002 | 12/1998 |
| WO | 03/082984 A1 | 10/2003 |

OTHER PUBLICATIONS

Office Action dated May 19, 2004 as issued in U.S. Appl. No. 10/384,075, filed Mar. 5, 2003.
Notice of Allowance dated Nov. 18, 2004 as issued in U.S. Appl. No. 10/384,075, filed Mar. 5, 2003.
Office Action dated Jul. 14, 2005 as issued in U.S. Appl. No. 10/384,075, filed Mar. 5, 2003.
Final Office Action dated Oct. 27, 2006 as issued in U.S. Appl. No. 10/384,075, filed Mar. 5, 2003.
Office Action dated Nov. 3, 2004 as issued in U.S. Appl. No. 10/654,661, filed Sep. 3, 2003.
Office Action dated Sep. 14, 2005 as issued in U.S. Appl. No. 10/654,661, filed Sep. 3, 2003.
Office Action dated Jun. 9, 2006 as issued in U.S. Appl. No. 10/654,661, filed Sep. 3, 2003.
Final Office Action dated Feb. 28, 2007 as issued in U.S. Appl. No. 10/654,661, filed Sep. 3, 2003.
Office Action dated Mar. 24, 2008 as issued in U.S. Appl. No. 11/741,536, filed Apr. 27, 2007.
Final Office Action dated Dec. 11, 2008 as issued in U.S. Appl. No. 11/741,536, filed Apr. 27, 2007.
Advisory Action dated Apr. 23, 2009 as issued in U.S. Appl. No. 11/741,536, filed Apr. 27, 2007.
Office Action dated Jun. 1, 2009 as issued in U.S. Appl. No. 11/741,536, filed Apr. 27, 2007.
Final Office Action dated Feb. 25, 2010 as issued in U.S. Appl. No. 11/741,536, filed Apr. 27, 2007.
Office Action dated Oct. 20, 2010 as issued in U.S. Appl. No. 11/741,536, filed Apr. 27, 2007.

* cited by examiner

*Primary Examiner* — Irina S Zemel

(57) ABSTRACT

Rosin modified phenolic resins are prepared by reacting together resin acid, fatty acid, tri- or higher-functional phenolic compound and aldehyde. The fatty acid may be Monomer (derived from the fatty acid dimerization process). The reaction mixture may optionally include a,13-olefinically unsaturated carbonyl compounds and/or polyol. The resin may be dissolved in a solvent to form a varnish. The resin may be used as a component of printing inks, e.g., inks for lithographic or gravure printing.

37 Claims, No Drawings

ROSEN PHENOLIC RESINS AND USES RELATED THERETO

RELATED APPLICATION DATA

This application is a Continuation of U.S. patent application Ser. No. 10/654,661, filed Sep. 3, 2003 (the specification of which is hereby incorporated by reference), now abandoned which is a Continuation-in-Part of Ser. No. 10/384,075, filed Mar. 5, 2003, now abandoned,

FIELD OF THE INVENTION

This invention is directed to resins made from resin acid, fatty acid, 5 phenolic compound and aldehyde, where the resins are useful as, for example, binders in inks for lithographic and gravure printing.

DESCRIPTION OF THE RELATED ART

The use of rosin as a major component in the preparation of binders for printing inks is very well known in the art. Such rosin-based ink resins are used for a wide variety of printing processes, including flexography, gravure printing, letterpress printing, and lithography. Each printing process requires ink with properties specific for that particular process, where relevant ink properties include Viscosity, solvent evaporation, wettability, pigment dispersion, and compatibility with the other materials present in the ink. In order to use rosin in inks having such a diverse range of necessary performance properties, it is very important to select the appropriate materials to react with the rosin to form the ink binder. See, e.g., Roger F. Burke, "Rosin-based Printing Inks," *Naval Stores*, Chapter 19, Pulp Chemicals Association (1989).

A typical commercially available rosin-modified phenolic resin is prepared from rosin, n-alkylphenol and para formaldehyde, where a polyol and optionally maleic anhydride may be included in the reaction mixture. The following references describe some of the rosin-based phenolic resins known in the art.

U.S. Pat. Nos. 6,172,174 (2001) and 5,969,071 (1999), to Matzinger, disclose phenolic rosin resins useful in lithographic printing inks. The 25 resins of Matzinger were prepared without th~ addition of antifoaming agents and with a reduction in the emission of aldehyde vapors compared to that commonly known in the art.

European Patent No. EP 1 054028 (2000), to Matzinger, provides hydrocarbon/acrylic hybrid resins for adhesives, inks, and coating compositions. Dicyclopentadiene is a necessary component for the resin compositions disclosed.

U.S. Pat. No. 5,498,684 (1996), to Bender, provides rosin-based 5 phenolic resins as binders for ink formulations. The Bender resins reportedly remain stable after at least six months of continuous air exposure.

Production cost is an important consideration in the preparation of rosin-based ink binders. It is well known to those experienced in the art that the natural resins and resin adds normally utilized in the production of printing inks are 10 a relatively expensive component of the ink binder. This expense is further compounded by the realization that the global supply of natural rosin is rapidly decreasing.

Potential future commercial regulations are another important consideration in the preparation of rosin phenolic ink binders. It is well-known in the art to incorporate alkylphenol, particularly nonylphenoJ, as a component in preparing certain rosin-based ink binders. However, recent literature provides reports of possible adverse endocrine disruption effects to humans, domesticated animals, and wildlife, resulting from the release of nonylphenol and other alkyl phenols into water sources (see, e.g., T. Sweeney, "Is Exposure to Endocrine Disrupting Compounds During Fetal/Post-Natal Development Affecting the Reproductive Potential of Farm Animals?" *Domest. Anim. Endocrinol.*, vol. 23, pp. 203-209 (2002); C. Sonnenschein and A. M. Soto, "An Updated Review of Environmental Estrogen and Androgen Mimics and Antagonists," *J. Steroid Biochem. Mol. Biol.*, vol. 65, pp. 143-150 (1998>>. In addition to the effect of these phenolic compounds on human and animal health, these findings could ultimately cause the cost of alkylphenols, and specifically nonylphenol, to increase dramatically as commercial manufacturers move away from producing these chemicals, thereby diminishing global supply. It is possible that production of nonylphenol may even be banned altogether.

The present invention addresses the problems associated with the use of alkylphenoJs in the preparation of rosin-containing ink resins, and provides further related advantages as described herein.

BRIEF SUMMARY OF THE INVENTION

In brief, the present invention is directed to new resins, and the use of these resins in printing and coating processes. These resins may be used for the preparation of varnishes, inks and coatings, preferably equal to or superior in performance to those in commerce today. The present invention also provides resins formed from reactants perceived to be less hazardous to humans than certain reactants typically used in the art.

In one aspect, the resins of the present invention are prepared from resin acid, fatty acid, phenolic compound that is at least trifunctional with respect to aldehyde reactivity, and aldehyde. Rosin is both a suitable and preferred source for the resin acids. Two preferred sources for fatty acid are tall oil fatty acid (TO FA) and Monomer (a blend of fatty acids derived from the fatty acid dimerization process). The reaction mixture may optionally include a,i3-olefinically unsaturated carbonyl compounds, e.g., a,~-ofefjnically unsaturated carboxylic acid(s) or anhydride{s), and/or polyol(s), as well as other possible optional reactants. The resin may be dissolved in a solvent to form a varnish, where the resin and/or varnish may be used as a component of inks for lithographic or gravure printing.

In one aspect, the present invention provides resin produced by a process, the process comprising reacting reactants at elevated temperature, the reactants comprising fatty acid, resin acid, phenolic compound, and aldehyde. At least some of the phenolic compound is trifunctional, that is, at least some of the phenolic compound is capable of reacting with three moles of aldehyde per mole of phenolic compound. Optionally, all of the phenolic compound is trifunctionaJ, where phenol is a preferred trifunctional phenolic compound. As one alternative, the phenolic compound is a mixture of phenolic compounds, where one of the phenolic compounds is phenol. When the phenolic compound is a mixture of phenolic compounds, then in various optional embodiments of the present invention, the phenolic compound that is at least trifunctional constitutes at least 5 wt %, or at least 10 wt %, or at least 15 wt %, at least 20 wt %, or at least 25 Wt %, or at least 30 wt %, or at least 35 wt %, or at least 40 wt %, or at least 45 wt %, or at least 50 wt %, or at least 55 wt %, or at least 60 wt %, or at least 65 wt %, or at least 70 wt %, or at least 75 wt %, or at least 80 wt %, or at least 85 wt %, or at least 90 wt %, or at least 95 wt % of the total weight of the mixture of phenolic compounds used to prepare the resin, where "or at least" in reference to each of the wt % values is meant to include 100%.

In another aspect, the present invention provides a resin produced by a process, where the process comprises reacting reactants at elevated temperature, the reactants comprising resin acid (e.g., rosin), fatty acid, phenolic compound, and aldehyde. In this aspect of the invention, the fatty acid constitutes at least 30 wt % of the total weight of the resin-forming components. In various embodiments, the fatty acid constitutes at least 32 wt %, or at least 34 wt %, or at least 36 wt %, or at least 38 wt %, or at least 40 wt %, or at least 42 wt %, or at least 44 wt %, or at least 46 wt %, or at least 48 wt %, or at least 50 wt % of the total weight of the resin-forming components. In various optional embodiments, in addition to the specification of the amount of fatty acid as set forth above, and for each of the specifications of the amount of fatty acid as set forth above (i.e., for each of 30, 32, 34, 36 etc. wt %), the resin is additionally described by the amount of trifunctional or greater phenolic compound that is present among the reactants. In one embodiment, trifunctional or greater phenolic compound is the only phenolic compound used to form the resin. In related embodiments, phenolic compounds that are trifunctional or higher constitutes at least 5 wt %, or at least 10 wt %, or at least 15 wt %, or at least 20 wt %, or at least 25 wt %, or at least 30 wt %, or at least 35 wt %, or at least 40 wt %, or at least 45 wt %, or at least 50 wt %, or at least 55 wt %, or at least 60 wt %, or at least 65 wt %, or at least 70 wt %, or at least 75 wt %, or at least 80 wt %, or at least 85 wt %, or at least 90 wt %, or at least 95 wt % of the total weight of the mixture of phenolic compounds. Phenol is a preferred trifunctional or higher phenolic compound for use in this aspect and other aspects of the present invention.

In another aspect, the present invention provides a resin produced by a process, the process comprising taking reactants to elevated temperature, the reactants comprising resin acid (e.g., rosin), fatty acid, phenolic compound, and aldehyde. In this aspect of the invention, some or all of the fatty acid is Monomer. In one embodiment, all of the fatty acid used to form the resin is Monomer. In a related embodiment, the fatty acid is a mixture of fatty acids, where at least some of that mixture comes from Monomer. Optionally some, or all, of the phenolic compound is trifunctionat or higher. i.e., some, or all, of the phenolic compound has at least three sites that are reactive with aldehyde. In fact, in one embodiment, trifunctional or greater phenolic compound is the only phenolic compound used to form the resin. In related embodiments, trifunctional or greater phenolic compound constitutes at least 5 wt %, or at least 10 wt %, or at least 15 wt %, or at least 20 wt %. or at least 25 wt %, or at least 30 wt %, or at least 35 wt %, or at least 40 wt %, or at least 45 wt %, or at least 50 wt %, or at least 55 wt %, or at least 60 wt %, or at least 65 wt %, or at least 70 wt %, or at least 75 wt %, or at least 80 wt %, or at least 85 wt %, or at least 90 wt %, or at least 95 wt % of the total weight of the mixture of phenolic compounds. Phenol is a preferred phenolic compound having a functionality of at least three with respect to reactivity with aldehyde.

In another aspect, the present invention provides a resin produced by a process, the process comprising exposing reactants to elevated temperature, the reactants comprising fatty acid, resin acid, phenolic compound, and aldehyde. In three separate embodiments of this aspect of the invention, i) at least some of the fatty acid is branched-chain monocarboxylic acid; ii) at least some of the fatty acid is cyclic-chain fatty acid; iii) both branched-chain fatty acid and cyclic-chain fatty acid are present in the fatty acid. In a preferred embodiment, at least some of the fatty acid is Monomer, where Monomer includes both branched-chain fatty acid and cyclic-chain fatty acid. Again, in a preferred but optional embodiment, some or all of the phenolic compound is at least trifunctionaf with respect to reacting with aldehyde, e.g., some or all of the phenolic compound is phenol. For each of the embodiments i), ii), and iii), the present invention optionally provides that all of the phenolic compound used to form the resin is at least trifunctional, where phenol is a preferred phenolic compound that is at least trifunctional. In addition, for each of the embodiments i), ii), and iii), the present invention optionally provides that phenolic compound that is at least trifunctional constitutes at least 5 wt %, or (in additional embodiments) at least 10 wt %, or at feast 15 wt %, or at least 20 wt %, or at least 25 wt %, or at least 30 wt %, or at feast 35 wt %, or at least 40 wt %, or at least 45 wt %, or at least 50 wt %, or at least 55 wt %, or at least 60 wt %, or at least 65 wt %, or at least 70 wt %, or at least 75 wt %, or at least 80 wt %, or at least 85 wt %, or at least 90 wt %, or at least 95 wt % of the total weight of the mixture of phenolic compounds used to form the resin.

In another aspect, the present invention provides a process for preparing a resin, the process comprising reacting reactants at elevated temperature, the reactants comprising rosin, fatty acid, aldehyde and phenolic compound that is at least trifunctional with respect to reactivity with aldehyde, wherein (a) the phenolic compound that is at least trifunctional constitutes at least 25 wt % of all phenolic compounds used to form the resin; and/or (b) the fatty acid contributes at least 5% of the weight of the listed reactants and the resin has a softening point that is equal to or greater than the softening point of a corresponding resin wherein some or all of the fatty acid is replaced with resin acid in the rosin. Thus, the invention provides the process comprising reacting reactants at elevated temperature, the reactants comprising rosin, fatty acid, aldehyde and phenolic compound that is at least trifunctional with respect to reactivity with aldehyde, wherein the phenolic compound that is at least trifunctional constitutes at least 25 wt % of all phenolic compounds used to form the resin. The invention also provides the process comprising reacting reactants at elevated temperature, the reactants comprising rosin, fatty acid, aldehyde and phenolic compound that is at least trifunctional with respect to reactivity with 6 aldehyde, wherein the fatty acid contributes at least 5% of the weight of the listed reactants and the resin has a softening point that is equal to or greater than the softening point of a corresponding resin wherein some or all of the fatty acid is replaced with resin acid in the rosin.

In another aspect, the present invention provides a process for preparing a resin, where the process comprises reacting reactants at elevated temperature, and the reactants comprise resin acid, fatty acid, aldehyde and phenolic compound that is at least trifunctional with respect to reactivity with aldehyde. In this aspect of the invention, the fatty acid contributes at least 5% of the weight of the listed reactants, and the resin has a softening point which is equal to or greater than the corresponding resin prepared under the same circumstances except resin acid replaces some or all of the fatty acid. In other words, the present invention provides a resin-forming process wherein some of the resin acid used in the preparation of a rosin-phenolic resin is replaced by fatty acid, but the softening point of the resin is not reduced, and may even be increased. In a related aspect, the present invention provides a process for preparing a resin, where the process comprises reacting reactants at elevated temperature, and the reactants comprise resin acid, fatty acid, aldehyde and phenolic compound that is at least trifunctional with respect to reactivity with aldehyde. In this related aspect of the invention, the fatty acid contributes at least 10% of the weight of the listed reactants, and the resin has a softening point of at least 11 aoe.

Optional reactants that may be included to prepare a resin of the invention include aJ3-Olefinically unsaturated carbonyl compound, for example, maleic anhydride, and/or polyol, for example, pentaerythritol. As stated above, a preferred phenolic compound is phenol. A preferred aldehyde is paraformaldehyde. Another optional resin-forming component is an alkaline metal salt, e.g., an alkaline metal salt wherein the cation of said salt is divalent. Suitable sources of resin acids for the invention include tall oil rosin, gum rosin, wood rosin, and combinations thereof. The resin acid or rosin may be pretreated, e.g., it may
be esterified or maleated, prior to being used in a resin-forming reaction. 7

In another embodiment, the present invention provides a lithographic ink resin produced by an improved process, the process comprising reacting the reactants as described above, and elsewhere herein, at elevated temperature so as to produce a lithographic ink resin of the present invention.

In another embodiment, the present invention provides a gravure ink resin produced by an improved process, the process comprising reacting the reactants as described above, and elsewhere herein, at elevated temperature so as to produce the gravure ink resin of the present invention.

In another embodiment, the present invention provides a varnish that includes a resin produced by the processes described herein, and a suitable solvent.

Suitable solvents are aromatic hydrocarbons, e.g., benzene, toluene and xylene, and aliphatic solvents such as heptane and naphtha. The varnish has a percent resin solids, where that percentage is typically in the range of 25-50%, on weight basis.

In another aspect, the present invention provides a printing ink comprising colorant, e.g., pigment, and a resin of the present invention, optionafly formulated for gravure or lithographic printing.

Thus, the present invention provides a process for forming a resin from reactants, the reactants comprising fatty acid, resin acid, aldehyde and phenolic compound that is at least trifunctional with respect to aldehyde reactivity.

The process comprising maintaining the reactants at elevated temperature for a time sufficient to form the resin. In a preferred embodiment, the phenofic compound that is at least trifunctional constitutes at least 25 wt % of all phenolic compounds used to form the resin, or the fatty acid contributes at least 5% of the weight of the listed reactants and the resin has a softening point of at least 105° e.

These and other aspects of this invention will become apparent upon reference to the following detailed description.

DETAILED DESCRIPTION OF THE INVENTION

The present invention provides for the preparation of resins useful as binders in printing inks. As used herein, the term "binder" refers to the product(s) of the reactions described herein. These products will have higher molecular weight than the starting materials, and may also be referred to as polymers.
These resin/polymer products are particularly useful in inks and coatings, where they serve one or more functions, for example, as agents that wet, disperse and/or stabilize pigment, or as agents that adhere pigment to the printed substrate. They may also, or alternatively, be included in ink in order to provide compatibility between two or more other ingredients of the ink. The binder may provide film forming properties and improve, for example, the gloss of the printed product. These are some exemplary reasons why a binder of the present invention may be included in an ink or coating formulation.

In one aspect, the resins of the present invention are characterized in terms of the process by which they are made. In particular, the resins are characterized in terms of the reactants that are reacted together to form the product resin. It has been surprisingly discovered that resins with excellent solubility in aliphatic solvents can be prepared by including both highly reactive phenolic compounds and fatty acid in a formulation to prepare a resin acid-modified phenolic resin. In another aspect, it has also been surprisingly discovered that the use of highly branched or cyclic fatty acid along with resin acid, phenolic compound and aldehyde, can advantageously be employed in the preparation of a resin. In a preferred embodiment of the invention, a resin is produced from both highly reactive phenolic compound and branched/cyclic fatty acid, in combination with resin acid and aldehyde.

As discussed in further detail below, resin acid-modified phenolic resins may be prepared by reacting together resin acid, fatty acid, tri- or higherfunctional phenolic compound and aldehyde. The fatty acid may be Monomer (derived from the fatty acid dimerization process). The reaction mixture may optionally include a, ~-olefinically unsaturated carboxylic acid(s) or anhydride(s), 9 and po~yol(s). The resin may be dissolved in a solvent to form a varnish. The varnish may be used as a component of inks for lithographic or gravure printing.

In describing the present invention, it should be understood that the word "a" refers to one or more of the indicated objects. For example, "a resin acid" refers to one or more resin acids, where resin acids may differ in terms of, e.g., their exact structure. Likewise, "a rosin" refers to one or more types of rosin, e.g., wood rosin, gum rosin, tall oil rosin, etc. Also. because the resins of the present invention are particularly useful as binders in ink formulations, the resins of the invention may be referred to herein as "binders". It should be noted that the term "binder" is sometimes used to refer to the resin per se, where the term "binder" is not to be construed as a limitation on the use of the resin or a statement of resin properties.

A. Reactants

In one aspect, the resin of the present invention is prepared from 15 reactants that include fatty acid, resin acid, aldehyde, and phenolic compound, with at least one of the following criteria being met:
 a) the fatty acid comprises branched-chain fatty acid;
 b) the fatty acid comprises cyclic-chain fatty acid; and
 c) the phenolic compound is, or includes, phenolic compounds
   that are at least tri-functional in terms of reactivity with aldehyde or reactive equivalents thereof.

Thus, in seven different and distinct aspects of the invention, the resin is prepared from resin acid, fatty acid, phenolic compound and aldehyde, such that a); or such that b); or such that c); or such that a) and b); or such that a) and c); or such that b) and c); or such that a) and b) and c), where each of a), b) and c) is defined above. As discussed in detail elsewhere herein, in various embodiments of the invention, it may be further required that a minimum amount of a specified component is present among the reactants, and/or that a specific resin (or varnish or ink) property is present in the resin.

Before further describing the resin of the invention and the process by which it may be prepared, each of the necessary reactants, and many optional reactants, will be described.

1. Resin Acid

Resin acids is a term of art that is used to refer to monocarboxylic diterpene acids, see, e.g. Simonsen, J.; Barton, D. H. R., The Terpenes, Vol. III, Cambridge University Press, Cambridge (1952); and Hanson, J. R., Natural Prod. Reports 5:211 (1988). Two common types of resin acid are the abietane-type and pimarane/isopimarane-type resin acids which each has three connecting six membered rings. The labdane-type resin acids are another well known class of resin acid, where labdane resin acids have two fused six-membered rings. Exemplary resin acids include, without limitation, abietic acid (CAS #514-10-3, see structure (1) below); communic acid (CAS #1231-35-2); dehydroabietic acid (CAS #1740-19-8); isopimaric acid (CAS #5835-26-7); levopimaric acid (CAS #79 54-9); neoabietic acid (CAS #471-77-2); palustric acid (CAS #1945-53-5); pimaric acid (CAS #127,27-5, see structure (2) below); and sandaracopimaric acid (CAS #471-74-9).

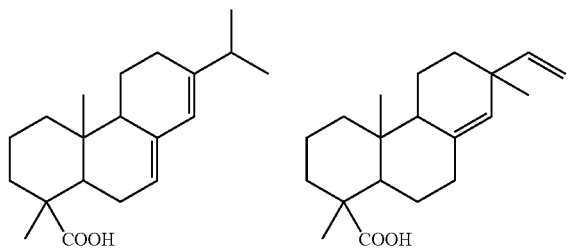 [SMILES: CC(C)C1=CC2=CCC3C(C)(C(=O)O)CCCC3(C)C2CC1 ; C=CC1(C)C=C2CCC3C(C)(C(=O)O)CCCC3(C)C2CC1]

Resin acids were initially discovered as a component of plants, and are commonly obtained today from pine trees. Exemplary sources of resin acids that may be used in the practice of the present invention are provided below.

As used herein, the term "resin acid" includes the monocarboxylic diterpene acids that are commonly known as resin acids from, e.g'., Simonsen, J.; Barton, D. H. R., The Terpenes, Vol. III, Cambridge University Press, Cambridge (1952). In one aspect, the resin acid used in preparing the binder of the present invention is a mixture of these monocarboxylic diterpene acids, optionally in ad mixture with other materials, as obtained from trees.

The resin acid, or resin acid-containing material (e.g., rosin), may be pre-treated or pre-reacted prior to being used with fatty acid, phenolic compound and aldehyde in a resin-forming reaction of the present invention. Accordingly, as used herein, the terms "resin acid" and "rosin" will include derivatives and reaction products of these monocarboxylic diterpene acids, as exemplified and discussed briefly below. The term "resin acid" is also intended to include compositions that contain some resin acid. In various optional embodiments, the resin acidcontaining composition contains, on a weight percent basis, at least 10%, or at least 20%, or at least 30%, or at least 40%, or at least 50%, or at least 60%, or at least 70%, or at least 75%, or at least 80%, or at least 85%, or at least 90%, or at least 95% resin acids. Further details regarding resin acid derivatives and reaction products may be found in, e.g'., Soltes, E. J. and Zinkel, D. F. "Chemistry of Rosin" Chap 9 of *Naval Stores*, Zinkel, D. F. and Russell, J. eds., Pulp Chemicals Association, New York, N.Y., 1989.

a. Salts

The carboxylic acid group of a resin acid may be converted into a salt form. These salt forms are considered a "resin acid" according to the present invention, and may be specifically referred to herein as resin acid salts. Exemplary counterions in a resin acid salt include, without limitation, monovalent and divalent metals, e.g., the cations of sodium, potassium, Zinc, magnesium and calcium. Sources for these counterions include, without limitation, calcium oXide, calcium hydroxide, magnesium oxide and magnesium hydroxide. Methods of neutralizing a resin acid with a metal salt, metal oxide, or the like so as to form resin acid salt are well known in the art. The products of such reactions are sometimes referred to as resin acid soaps. The resin acid may be present within rosin, and accordingly rosin soaps are a source of resin acid soap according to the present invention.

Also, rosin soaps are considered a "rosin" of the present invention.

b. Esters

The carboxylic acid group of a resin acid may participate in an esterification reaction so as to be converted into an ester. Esters of resin acids are "resin acids" according to the present invention, and may be specifically referred to herein as resin acid esters. The resin acid may be reacted with a monohydric or polyhydric (polyol) molecule to convert the carboxylic acid into a carboxylate ester.

Exemplary monohydric molecules include, without limitation, methanol, ethanol, propanol, butanol, and 2-ethylhexanol.

Exemplary polyhydric molecules, also known as polyols, include, without limitation, $C_2$-$C_{36}$ dihydric compounds, $C_3$-$C_{36}$ trihydric compounds, $c_5$-$c36$ tetra hydric compounds, $C_5$-$C_{38}$ pentahydric compounds and $C_6$-$C_{36}$ hexahydric compounds. Specific polyols include, without limitation, ethylene glycol, propylene glycol, diethylene glycol, triethylene glycol, butanediol, glycerol, trimethylolpropane, triethylolpropane, pentaerythritol, and carbohydrate derivedpolyhydric molecules such as dimerized trimethylolpropane and dimerized penta erythritol. When resin acids are esterified with polyoJs, one or more of the hydroxyl groups of the polyol may enter into an esterification reaction, i.e., a resin acid ester may, or may not, contain residual hydroxyl groups from the polyol.

A type of resin acid ester is known in the art as an alkyd resin. Alkyd resins may be prepared by reaction of resin acid, fatty acid triglyceride, diacid (e.g., isophthalic acid) and polyol (e.g., glycerin). There are numerous other alkyd formulations that use resin acid as an alkyd-forming reactant, where these alkyds are referred to herein as resin acid alkyds. Resin acid alkyds are a "resin acid" as that term is used herein.

The resin acid may be present in rosin, and accordingly rosin esters are a source of resin acid ester according to the present invention. Also, rosin esters are considered a "rosin" of the present invention. Methods to esterify rosin and resin acids with mono- and polyhydric compounds are well known in the art.

c. Adducts

Resin acids may undergo Diels-Alder and/or ene-type reactions with a,f3-olefinically unsaturated carbonyl compounds, where these reaction products 10 will be referred to herein as resin acid adducts. Resin acid adducts are included within the scope of the term "resin acid" as used herein.

Exemplary a,l3-olefinically unsaturated carbonyl compounds include, without limitation, maleic anhydride, fumaric acid, mono($C_1$-$C_{12}$alkyl) ester of fumaric acid, di($C_1$-$C_{12}$alkyJ) ester of fumaric acid, acrylic acid, $C_1$-$C_{12}$alkyl ester of acrylic acid, methacrylic acid, $C_1$-$C_{12}$alkyl ester of methacrylic acid, itaconic acid, and $C_1$-$C_{12}$alkyl ester of itaconic acid. As used herein, "alkyl" refers to a monovalent hydrocarbon radical group (i.e., a hydrocarby~monovalent radical) containing exclusively C—C and C—H single bonds, while "hydrocarbon" refers to any molecular structural domain containing exclusively carbon and hydrogen atoms; "alkenyl" refers to a hydrocarbyl monovalent radical containing at least one C=C double bond, while "alkynyl" refers to a hydrocarbyl monovalent radical containing at least one C~C triple bond.

Rosin may serve as the source of the resin acid, where rosin adducts are sources of resin acid adducts of the present invention. Rosin adducts will be considered within the scope of the terms "rosin" and "resin acid". The add uction reaction between resin acid (e.g., rosin) and a.~-olefinjcally unsaturated carbonyl compound is well known in the art, and can be made to occur by heating resin acid and Q,l3-olefinically unsaturated carbonyl compounds to a reaction-forming temperature, e.g., about 150° C.

d. Dimers

Under acid conditions and elevated temperatures, resin acids react with themselves to form dimerization products. Some trimerization, etc. reaction also occurs during this dimerization process, but typically dimerized product forms to the greatest extent The action of strong heat and/or strong acids on resin acid is sometimes referred to as "polymerization" of resin acids. The product(s) from this reaction will be referred to herein as resin acid dimers, where resin acid dimers are a "resin acid" of the present invention. Rosin may provide the source for the resin acid. In this case, polymerized rosin may provide the source of the polymerized resin acid. Also, polymerized rosin is considered within the scope of the term "rosin" as used herein.

e. Isomers

Resin acids may be exposed to various reaction conditions that yield isomerized resin acids. An isomerized resin acid has, e.g., a different configuration of double bonds than did the original resin acid. Temperature and/or acid (for example a Lewis or Bmnsted acid) are suitable conditions for achieving resin acid isomerization. Upon exposure to isomerization conditions, resin acids that are not otherwise naturally occurring may be produced, however, isomerization conditions can also convert a resin acid from one naturally occurring structure to another naturally-occurring structure. Isomer(s) that result from exposure of resin acid to isomerization conditions produces resin acid isomers that are within the scope of the term "resin acid" as used herein. Reaction conditions to achieve resin acid isomerization are well known in the art. Rosin may provide the source of the resin acid. In this case, isomerized rosin may provide the source of the isomerized resin acid. Isomerized rosin is considered within the scope of the term "rosin" as used herein.

f. Hydrogenation

Resin acid may be exposed to hydrogen gas in order to reduce the double bond(s) present in the acid. Typically a catalyst, such as palladium on 15 carbon or Raney nickel, along with elevated temperature and pressure) is utilized to achieve the efficient hydrogenation of a resin acid. The reaction product(s) from hydrogenation of resin acid will be referred to herein as hydrogenated resin acid, where hydrogenated resin acid is a "resin acid" within the meaning of that term as used herein. Hydrogenation of resin acid is well known in the art.

Although hydrogenated resin acid, e.g., hydrogenated rosin, may be used in the practice of the present invention, it is preferred that not all of the resin acid be completely saturated. The presence of unsaturation in the resin acid is considered desirable in order to allow reaction to occur between the resin acid and phenolic compound and/or aldehyde and/or the reaction product there between. Accordingly, if hydrogenated resin acid or rosin is utilized in the practice of the present invention, some unsaturated resin acid or rosin is also preferably present in the reaction mixture.

Hydrogenation can, however, be applied to the reaction product of resin acid+fatty acid+aldehyde+phenolic compound. Hydrogenation of this reaction product tends to increase the stability of the resin, where increased resin stability is particularly important is non-pigmented products, e.g., overprint varnishes. Accordingly, in one aspect, the present invention provides an overprint varnish comprising a resin of the present invention, where the resin has been optionally posHreated by hydrogenation. In addition, the present invention provides a resin, and a process for its preparation, wherein resin acid+fatty acid+aldehyde+phenolic compound as described herein are reacted to form a resin, and the resin is post-treated by hydrogenation.

g. Dehydrogenation/Disproportionation

Many resin acids have two double bonds. Transfer of hydrogen from one resin acid to another resin acid, so as to provide resin acids with zero and three double bonds, respectively, is referred to as dehydrogenation/disproportionation. Typically a metal on carbon catalyst, where the metal may be, e.g., palladium, platinum or nickel, is used to facilitate the dehydrogenation/disproportionation reaction. However, other reaction conditions to facilitate dehydrogenation/disproportionation of resin acid are also known in the art. The product(s) from this reaction may be referred to as disproportionated resin acid, where these product(s) are a "resin acid" within the meaning of this term as used herein. However, it is preferred that disproportionated resin acids not be the only resin acids present in the resin-forming reaction mixtures of the present invention.

The foregoing are exemplary of rosin and resin acid derivatives and reaction products that are included within the scope of the terms "rosin" and "resin acid" respectively as used herein. The present invention provides resinous binders for printing inks that are prepared from resin acid, fatty acid, phenol and aldehyde. So long as the resin acid derivative is still reactive with phenol and aldehyde, it may be included within the scope of the term "resin acid" as that term is used herein. The term "natural resin acid" will be used to refer to a resin acid that is naturally occurring or found in untreated or unmodified rosin, e.g., abietic acid, communic acid, dehydroabietic acid, isopimaric acid, levopimaric acid, neoabietic acid, palustric acid, pimaric acid, sandaracopimaric acid, etc. The term "natural rosin" will be used to refer to rosin that has not been chemically modified or treated.

The resin acid typically contributes 1-85 wt % of the total weight of the reactants used to form the resin of the present invention. In optional embodiments, resin acid contributes up to 85 wt %, or up to 80 wt %, or up to 75 wt %, or up to 70 wt %, or up to 65 wt %, or up to 60 wt %, or 10-85 wt %, or 10-80 wt %, or 1075 wt %, or 10-70 wt %, or 10-65 wt %, 10-60 wt %, or 20-85 wt %, or 20-80 wt %, or 2075 wt %, or 20-70 wt %, or 20-65 wt %, or 20-60 wt %, or 25-85 wt %, or 25-80 wt %, or 25-75 wt %, or 25-70 wt %, or 25-65 wt %, or 25-60 wt %, or 30-85 wt %, or 30-80 wt %, or 30-75 wt %, or 30-70 wt %, or 30-65 wt %, or 30-60 wt %, or 35-85 wt %, or 3580 wt %, or 35-75 wt %. or 35-70 wt %. or 35-65 wt %, or 35-60 wt %, or 40-85 wt %, or 40-80 wt %, or 40-75 wt %, or 40-70 wt %, or 40-65 wt %, or 40-60 wt %, or 45-85 wt %, or 45-80 wt %, or 45-75 wt %, or 45-70 wt %, or 45-65 wt %, or 45-60 wt % of the total weight of the reactants used to form a resin of the invention. 17

In a preferred embodiment, rosin is used as the source of resin acids, and rosin contributes up to 85 wt %, or up to 80 wt %, or up to 75 wt %, or up to 70 wt %, or up to 65 wt %, or up to 60 wt %, or 10-85 wt %, or 10-80 wt %, or 10-75 wt %, or 10-70 wt %, or 10-65 wt %, 10-60 wt %, or 20-85 wt %, or 20-80 wt %, or 20-75 wt %, or 20-70 wt %, or 20-65 wt %, or 20-60 wt %, or 25-85 wt %, or 25-80 wt %, or 2575 wt %, or 25-70 wt %, or 25-65 wt %, or 25-60 wt %, or 30-85 wt %, or 30-80 wt %, or 30-75 wt %, or 30-70 wt %, or 30-65 wt %, or 30-60 wt %, or 35-85 wt %, or 35-80 wt %, or 35-75 wt %, or 35-70 wt %, or 35-65 wt %, or 35-60 wt %, or 40-85 wt %, or 4080 wt %, or 40-75 wt %. or 40-70 wt %, or 40-65 wt %, or 40-60 wt %, or 45-85 wt %, or 45-80 wt %, or 45-75 wt %, or 45-70 wt %, or 45-65 wt %, or 45-60 wt % of the total weight of the reactants used to form a resin of the invention.

In a preferred embodiment, the resin acid contributes about 4560 wt % of the total weight of the reactants used to form the resin. In another preferred embodiment rosin serves as the source of resin acids and rosin contributes about 45-60 wt % of the total weight of the reactants.

2. Fatty Acid

The term "fatty acid" refers to chemicals of the formula $R^I$—COOH, as well as derivatives and analogs thereof, where $R^1$ is a hydrocarbon group of at least six carbons. The term hydrocarbon refers to any molecular structure containing only hydrogen and carbon atoms. The hydrocarbon group may be saturated U.e., contains no double or triple carbon-carbon bonds) or unsaturated (i.e., contains at least one double or triple carbon-carbon bond), with no limitation on the number of unsaturations. $R^I$ may independently be characterized by its hydrocarbon chain configuration as linear, branched, or cyclic, and may also be characterized in terms of the number of carbons present in the $R^I$ group.

In various aspect of the invention, the fatty acid includes, to the extent of at least 50 wt %, or at least 60 wt %, or at least 70 wt %, or at least 80 wt %, or at least 90 wt %, based on the total weight of fatty acid, or is exclusively comprised of, fatty acids that have 12-28, or 14-28, or 16-28, or 18-28, or 12-22, or 14-22, or 16-22, or 18-22, or 12-20, or 14-20, or 16-20, or 18-20 carbon atoms. Optionally, the fatty add is a liquid at room temperature, or has a melting point below 100° C. Optionally the fatty acid is a mixture of fatty acid structures, e.g., TOFA and Monomer.

Although the terms "linear", "branched" and "cyclic" are well known to one of ordinary skill in the art, for additional clarity illustrative examples of a C8 fatty acid (i.e., a fatty acid having a total of 8 carbons) having a linear-(structure (1)), branched-(structure (2>>) and cyclic-(structure (3)) chain hydrocarbon group are shown below:

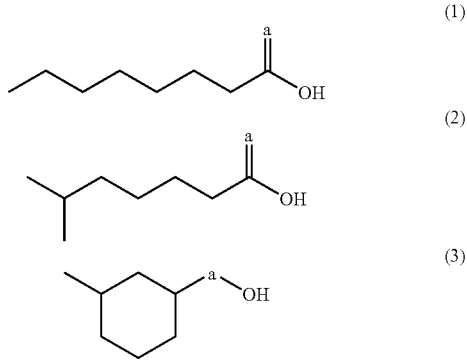

Fatty acids wherein $R^1$ is a chain of at least 14 carbon atoms are frequently known as "long-chain monocarboxylic acids" or "long-chain fatty acids." In one aspect of the present invention, the fatty acid used to prepare a resin of the invention is, or includes, long-chain fatty acid. Exemplary long-chain fatty acids include saturated acids such as, without limitation, capric, lauric, myristic, palmitic, stearic, hydroxystearic, and arachidic acids; and unsaturated acids such as, without limitation, oleic, linoleic, linolenic, and arachidonic acids; and mixtures thereof. In a preferred embodiment, the cyclic fatty acid has a single ring, such as shown in structure (3) above. However, the cyclic fatty acid may also include a branch point in the chain. In a preferred embodiment, the branched chain fatty acid is acyclic, In a preferred aspect, the fatty acid reactant includes branched-chain fatty acid, or cyclic-chain fatty acid, or a combination of branched-chain and cyclic-chain fatty acids. In an optional aspect, the fatty acid reactant further comprises linear-chain fatty acid.

The fatty acid may be a derivative or analog of the chemicals of the formu[a $R^1$—COOH. A fatty acid analog refers to compounds wherein one or more atoms are replaced with different atoms, but the resulting compound still has the 10 ability to provide fatty character to the resin. For example, hydroxyl-substituted fatty acids are fatty acid analogs, where ricinoleic acid (also known as 12hydroxystearic acid) is an example of this type of fatty acid analog.

Fatty acid derivatives are fatty acids that have undergone some sort of chemical treatment which changes the chemical structure of the fatty acid, however the product of this chemical treatment still has the ability to provide fatty character to a resin of the present invention. The following are exemplary fatty acid derivatives.

a. Salts

The carboxylic acid group of a fatty acid may be converted into a salt form. These salt forms are considered a "fatty acid" according to the present invention, and may be specifically referred to herein as fatty acid salts. Exemplary counterions in a fatty acid salt include, without limitation, sodium, potassium, zinc, magnesium and calcium. Sources for these counterions include, without limitation, calcium oxide, calcium hydroXide, magnesium oxide and magnesium hydroXide. Methods of neutralizing a fatty acid with a metal salt, metal oxide, or the like so as to form fatty acid salt are well known in the art. The products of such reactions are sometimes referred to as fatty acid soaps.

b. Esters

The carboxylic acid group of a fatty acid may participate in an esterification reaction so as to be converted into an ester. Esters of fatty acids are "fatty acids" according to the present invention, and may be specifically referred to 5 herein as fatty acid esters. The fatty acid may be reacted with a monohydric or polyhydric (polyol) molecule to convert the carboxylic acid into a carboxylate ester.

Exemplary monohydric molecules include, without limitation, methanol, ethanol, propanol, butanol. and 2-ethylhexanol.

Exemplary polyhydric molecules, also known as polyols, include, without limitation. $C_2$-$C_{36}$ dihydric compounds, C3-C36 trihydric compounds, $C_5$-$C_{36}$ tetrahydric compounds, $C_5$-$C_{36}$ pentahydric compounds and $C_6$-$C_{36}$ hexahydric compounds. Specific polyols include, without limitation, ethylene glycol, propylene glycol, diethylene glycol, triethylene glycol, butanediol, glycerol, trimethylolpropane, triethylolpropane, pentaerythritol, carbohydrate, dimerized trimethylolpropane, and dimerized pentaerythritol. When fatty acids are esterified with polyols, one or more of the hydroxyl groups of the polyol may enter into an esterification reaction, i.e., a fatty acid ester may, or may not, contain residual hydroxyl groups from the polyol. Accordingly, a "fatty acid" of the present invention may contain some hydroxyl groups.

Methods to esterify fatty acids with mono- and polyhydric compounds are well known in the art. Many fatty acid esters, especially triglycerides, are known in the art and are commercially available. In fact, many triglycerides are naturally occurring oils and fats. Examples include peanut oil, tallow, castor oil, palm oil, olive oil, rapeseed oil, soybean oil, sunflower oil and linseed oil.

c. Adducts

Unsaturated fatty acids may undergo Diels-Alder and/or ene-type reactions with aJ3-olefinically unsaturated carbonyl compounds, where these reaction products will be referred to herein as fatty acid adducts. Fatty acid adducts are included within the scope of the term "fatty acid" as used herein. Exemplary a,l3-olefinically unsaturated carbonyl compounds include, without limitation, maleic anhydride, fumaric acid, mono($C_1$-$C_{12}$alkyl) ester of fumaric acid, di($C_1C_{12}$alkyl) ester of fumaric acid, acrylic acid, $C_1$-$C_{12}$alkyl ester of acrylic acid, methacrylic acid, $C_1$-$C_{12}$alkyl ester of methacrylic acid, itaconic acid, and $C_1$-$C_{12}$alkyl ester of itaconic acid. The adduction reaction between fatty acid and a,(3-olefinically unsaturated carbonyl compound is well known in the art.

d. Dimers

Under acid conditions and elevated temperatures, fatty acids react with themselves to form dimerization products. Some trimerization, etc. reaction also occurs during this dimerization process, but typically dimerized product forms to the greatest extent. The action of strong heat and/or strong acids on fatty acid is often referred to as polymerization of fatty acids. The product(s) from this reaction are commonly referred to as dimer acid, or more simply as dimer. Dimer acid is a "fatty acid" of the present invention. A by-product of this polymerization process is called Monomer, where Monomer is a mixture of fatty acids. In one aspect, Monomer provides some or all of the fatty acid used to form a resin of the present invention.

e. Isomers

Unsaturated fatty acids may be subjected to various reaction conditions that yield isomerized fatty acids. An isomerized fatty acid has, e.g., a different configuration of double bonds than did the original fatty acid. Temperature and/or acid (for example Lewis or Bmnsted acid) are suitable conditions for achieving fatty acid isomerization. Isomer(s) that result from exposure of fatty acid to isomerization conditions produces fatty acid isomers that are within the scope of the term "fatty acid" as used herein. Reaction conditions to achieve fatty acid isomerization are well known in the art.

f. Hydrogenation

Unsaturated fatty acid may be exposed to hydrogen gas in order to reduce the double bond(s} present in the acid. Typically a catalyst, such as palladium on carbon or Raney nickel, along with elevated temperature and pressure, is utilized to achieve the efficient hydrogenation of a fatty acid. The reaction product(s) from hydrogenation of unsaturated fatty acid will be referred to herein as saturated fatty acid, where both saturated and unsaturated fatty acids are "fatty acid" within the meaning of that term as used herein. Hydrogenation of fatty acid is well known in the art.

The term "fatty acid" is also intended to include compositions that contain some fatty acid. In various optional embodiments, the fatty acid-containing composition contains, on a weight percent basis, at least 10%, or at least 20%, or at least 30%, or at least 40%, or feast 50%, or at least 60%. or at least 70%, or at least 75%, or at least 80%, or at least 85%, or at least 90%, or at least 95% fatty acids.

In various aspects of the present invention, fatty acid contributes up to 85 wt %, or up to 75 wt %, or up to 65 wt %, or up to 50 wt %, or up to 40 wt %. or up to 30 wt %, or up to 25 wt %, or 1-85 wt %, or 1-75 wt %, or 1-65 wt %, or 1-50 wt %, or 140 wt %, 1-30 wt %, or 1-25 wt %, or 5-65 wt %. or 5-50 wt %, or 5-40 wt %, 5-30 wt %, or 5-25 wt %, or 10-65 wt %, or 10-50 wt %, or 10-40 wt %, 10-30 wt %. or 10-25 wt %, or 15-65 wt %, or 15-50 wt %. or 15-40 wt %, 15-30 wt %. or 15-25 wt %, of the total weight of the resin-forming composition, where for each of these ranges, Monomer may be all of the fatty acid, or may be any fraction of the fatty acid as set forth in the previous paragraph. In a preferred embodiment, fatty acid constitutes about 15-25 wt % of the total weight of the reactants used to form the resin.

In one aspect of the invention. the weight of resin acids, or the weight of rosin, exceeds the weight of fatty acid in the reaction mixture. In general, as the level of fatty acid increases in proportion to the level of resin acid, the resulting resin tends to have a lower softening point. Accordingly, in various optional embodiments of the invention, the weight of resin acids, or the weight of rosin, is at 23 least 10% greater, or at least 20% greater, or at least 30% greater, or at least 40% greater, or at least 50% greater, or at least 60% greater, or at least 70% greater, or at least 80% greater, or at least 90% greater, or at least 100% greater than the weight of fatty acid present in the reaction mixture. In other optional embodiments, resin acid contributes at least 50%, or at least 55%, or at least 60%, or at least 65%, or at least 70%, or at least 75%, or at least 80%, or at least 85%, or at least 90%, or at least 95% of the total weight of resin acid and fatty acid utilized to prepare a resin. In an optional embodiment, rosin contributes 50-95%, and fatty acid contributes 5-50% of the total weight of fatty acid and resin acid used to prepare a resin of the invention. In another optional embodiment, rosin contributes 60-90%, and fatty acid contributes 10-40% of the total weight of fatty acid and resin acid used to prepare a resin of the invention. In another optional embodiment, rosin contributes 65-85%, and fatty acid contributes 15-35% of the total weight of fatty acid and resin acid used to prepare a resin of the invention.

In general, the reaction mixture should contain significant amounts of both resin acids and fatty acids. In various optional embodiments of the invention, when rosin serves as the source of resin acids, and ignoring any fatty acids that may be present in the rosin, fatty acid constitutes at least 5 wt % of the total weight of the reactants when rosin contributes, in various embodiments, at least 30 wt %, or at least 35 wt %, or at least 40 wt %, or at least 45 wt %, or at least 50 wt %, or at least 55 wt %, or at least 60 wt %, or at least 65 wt %, or at least 70 wt %, or at least 75 wt % of the total weight of the resin-forming reactants. In various additional optional embodiments of the invention, when rosin serves as the source of resin acids, and ignoring any fatty acids that may be present in rosin, fatty acid constitutes at least 10 wt % of the total weight of the reactants when rosin contributes, in various embodiments, at least 30 wt %, or at least 35 wt %, or at least 40 wt %, or at least 45 wt %, or at least 50 wt %, or at least 55 wt %, or at least 60 wt %, or at least 65 wt %, or at least 70 wt %, or at least 75 wt % of the total weight of the resin-forming reactants.

The fatty acid provides aliphatic character to the resin. In other words, including fatty acid among the reactants increases the aliphatic solvent compatibility of the resulting resin. While this is generally a desirable result, a second effect of including fatty acid among the reactants is that the softening point of the resin tends to decrease. For many commercial applications, the softening point of the resin should be at least about 1 oo° C., and often a higher softening point is even more desirable, e.g., at least 105° C., or at least 110° C., or at least 120° C., or at least 130° C., etc. In one aspect, the present invention surprisingly provides that a significant amount of fatty acid can be included among the reactants while still maintaining a commercially desirable softening point.

Thus, in one aspect, the present invention provides a process for preparing a resin, the process comprising reacting reactants at elevated temperature, the reactants comprising resin acid, fatty acid, aldehyde and phenolic compound that is at least trifunctional with respect to reactivity with aldehyde, where the fatty acid contributes at least 5% of the weight of the listed reactants, and the resin has a softening point which is equal to or greater than the corresponding resin prepared wherein resin acid replaces some or all of the tatty acid. In other words, the present invention provides a resin-forming process wherein some of the resin acid used in the preparation of a rosin-phenolic resin is
replaced by fatty acid, but the softening point of the resin is not reduced, and may even be increased. This maintenance of softening point is achieved by including phenol compound that is at least tri-functional with respect to aldehyde reactivity, among the resin-forming reactants. From a practical point of view this is a very important discovery because fatty acid is much less expensive, and much more available, than resin acid.

Thus, in one aspect the present invention provides:

(i) A process for preparing a resin, the process comprising reacting reactants at elevated temperature, the reactants comprising resin acid, fatty acid, aldehyde and phenolic compound that is at least trifunctional with respect to reactivity with aldehyde, where the fatty acid contributes at least 5% of the weight 25 of the listed reactants, and the resin has a softening point which is equal to or greater than the corresponding resin prepared wherein resin acid replaces some or all of the fatty acid.

In various additional aspects the invention also provides:

(ii) A process for preparing a resin, the process comprising reacting reactants at elevated temperature, the reactants comprising resin acid, fatty acid, aldehyde and phenolic compound that is at least trifunctional with respect to reactivity with aldehyde, where the fatty acid contributes at least 5% of the weight of the listed reactants, and the resin has a softening point of at least 105° e.

(iH) A process for preparing a resin, the process comprising reacting reactants at elevated temperature, the reactants comprising resin acid, fatty acid, aldehyde and phenolic compound that is at least trifunctional with respect to reactivity with aldehyde, where the fatty acid contributes at least 10% of the weight of the listed reactants, and the resin has a softening point of at least 110° C.

(iv) A process for preparing a resin, the process comprising reacting reactants at elevated temperature, the reactants comprising resin acid, fatty acid, aldehyde and phenolic compound that is at least trifunctional with respect to reactivity with aldehyde, where the fatty acid contributes at least 15% of the weight of the listed reactants, and the resin has a softening point of at least 110° C.

(v) A process for preparing a resin, the process comprising reacting reactants at elevated temperature, the reactants comprising resin acid, fatty acid, aldehyde and phenolic compound that is at least trifunctional with respect to reactivity with aldehyde, where the fatty acid contributes at least 5% of the weight of the listed reactants, and the resin has a softening point of at least 120° C.

(Vi) A process for preparing a resin, the process comprising reacting reactants at elevated temperature, the reactants comprising resin acid, fatty acid, aldehyde and phenolic compound that is at least trifunctional with respect to reactivity with aldehyde, where the fatty acid contributes at least 10% of the weight of the listed reactants, and the resin has a softening point of at least 120° C.

(vii) A process for preparing a resin, the process comprising reacting reactants at elevated temperature, the reactants comprising resin acid, fatty acid, aldehyde and phenolic compound that is at least trifunctional with respect to reactivity with aldehyde, where the fatty acid contributes at least 15% of the weight of the listed reactants, and the resin has a softening point of at least 120° e.

For each of aspects (i) through (vii) identified above, the process may optionally be further characterized in terms of one or more of the features disclosed herein. For example, the reactants may further comprise polyoL As another example, the reactants may further comprise o,13-olefinically unsaturated carbonyl compound. As another example, the reactants further comprise metal oxide. Of course, the reactants may include two or more of polyol, a,13-olefinically unsaturated carbonyl compound, and metal oxide. As a final example, some or all of the phenolic compound that is at least trifunctional with respect to reactivity with aldehyde may be phenol.

According to the present invention, a combination of resin acids and
fatty acids may be used in the preparation of a resin, while still achieving a commercially desirable softening point, when the reactants include aldehyde and phenolic compound that is at least trifunctional with respect to reactivity with aldehyde. The phenolic compound that is at least trifunctional with respect to
reactivity with aldehyde is a highly reactive material, more reactive than, e.g., phenolic compound that is difunctional with respect to reactivity with aldehyde such as nonylphenol. When phenolic compound that is at least trifunctional with respect to reactivity with aldehyde is used as sole phenolic material used in the preparation of the resin, and the fatty acid provides about 5-40% of the total weight of the
reactants, then the phenolic compound preferably provides about 5-15%, more preferably about 7-12% of the total weight of the reactants, with a preferred formaldehyde/phenolic compound ratio of about 2-4. At high phenolic compound levels, the reactants tend to form a gel, which is undesirable. At lower phenolic compound levels, the softening point of the resin is often less than 1 aaoe, which is undesirable for many, although not all, commercial applications. 27

In general, the use of more fatty acid is preferably accompanied by the use of more phenolic compound that IS at least trifunctional with respect to aldehyde reactivity. For example, if the fatty acid contributes about 35% of the total weight of the reactants, a reaction mixture with 7% phenolic compound will tend to provide a resin with a lower softening point than is obtained if the reaction mixture includes 11% phenolic compound. It is possible to increase the total amount of phenolic compound present in the reaction mixture by using a combination of phenolic compound that is difunctional with respect to aldehyde reactivity, and phenolic compound that is at least trf-functional with respect to aldehyde reactivity.

In general, gels are less likely to form if the fatty acid provides less than about 35% of the total weight of the reactants, the phenolic compound that is at least trifunctional with respect to aldehyde reactivity provides fess than about 12% of the total weight of the reactants, and the weight ratio of aldehyde to
phenolic compound is less than about 3.5. When the aldehyde to phenolic compound ratio is reduced, some maleic anhydride may be included among the reactants in order to maintain or increase the softening point of the resin. Polyol, e.g., pentaerythritol, may also be included among the reactants in order to increase the softening point of the resin.

3. Phenolic Compound

Phenolic compounds are reactive with formaldehyde and other aldehydes at the (two) ortho and (one) para positions of the aromatic ring, relative to the location of the hydroxyl group that is also directly bonded to the aromatic ring. Resins of the present invention may be prepared from phenolic compound(s) that are at least trifunctional. That is, at least some of the phenolic compound utilized in preparing the inventive resin may have at least three hydrogen atoms located ortho or para to a hydroxyl group that is also directly bonded to an aromatic ring.

Tri- or higher-functional phenols are a preferred reactant in the resinforming compositions of the present invention. The trifunctional phenols suitable for use in the compositions of this invention include phenol itself (monohydroxybenzene, CAS #108-95-2) and the meta substituted derivatives of phenol such as m-cresol, resorcinol, m-chlorophenol, 3,5-dimethylphenol, and the like.

The tetrafunctional phenols suitable for use in the compositions of this invention include 2,2-bis(4-hydroxyphenyl) propane, 2,2-bis(4-hydroxyphenyl)ethane, 4,4'-dihydroxydiphenylsulphide, 4,4'-dihydroxydiphenylsulphone, 4,4' dihydroxybiphenyl. and the like.

In one embodiment, tri- or higher-functional phenols are the only phenolic compound(s) used to prepare a resin of the invention. In another embodiment, tri- or higher-functional phenols constitutes at least 98% by weight of the total weight of phenolic compound used to prepare a resin of the present invention. In other embodiments of the invention, tri- or higher-functional phenols constitutes at least 5 wt %, or (in additional embodiments) at least 10 wt %, or at least 15 wt %, or at least 20 wt %, or at least 25 wt %, or at least 30 wt %, or at least 35 wt %, or at least 40 wt %, or at least 45 wt %, or at least 50 wt %, or at least 55 wt %, or at least 60 wt %, or at least 65 wt %, or at least 70 wt %, or at least 75 wt %, or at least 80 wt %, or at least 85 wt %, or at least 90 wt %, or at least 95 wt % of the total weight of the mixture of phenolic compounds used to form the resin.

The at least trifunctional phenolic compound may be in admixture with mono- and/or difunctional phenol compound, i.e "phenol compounds having only one (for monofunctional) or only two (for difunctional) hydrogen substitutions at the ortho and para positions relative to the phenolic hydroxyl group. Exemplary mono- and difunctionaJ phenolic compounds have one or two non-hydrogen substituents at the ortho and para positions, where exemplary substituents include alkyl groups, e.g "C1-C12 alkyl groups, cycloaliphatic groups, e.g., C6 cycloaliphatic groups, and aryl groups, e.g., phenyl.

Although alkylphenols pose potential health concerns, they are commonly used in the preparation of rosin-phenolic resins because the alkyl chain 29 imparts needed aliphatic solvent compatibility to the resin. That is, in order for the resin to be commercially viable, it should be soluble in the types of solvents that are utilized for the target ink, typically either lithographic or gravure ink. In these types of ink, the resins must be soluble in aliphatic solvent. In order to achieve this aliphatic solvent solubility, ink resins that utilize rosin and phenolic compounds typically turn to alkyl phenols because the presence of the alkyl group is thought to provide or enhance the needed aliphatic solvent solubWty.

In a very surprising discovery, the present inventor has found that it is not necessary to include alkyl phenol in a resin-forming reaction, in order for the product resin to have the necessary aliphatic solvent solubility. Instead, phenol itself or another tri- or higher-functional phenolic compound may be used in lieu of some, or even all, of the alkyl phenol commonly used in resin-forming reactions, so long as the resin-forming reactants also include fatty acid.

In various aspects of the present invention, phenolic compound is up to 50%, or up to 40%, or up to 30%, or up to 20%, or 1-15%, or 1-50%, or 1-40%, or 1-30%, or 1-20%, or 1-15%, or 2-50%, or 2-40%, or 2-30%, or 2-20%, or 2-15%, or 3-50%, or 3-40%, or 3-30%, or 3-20%, or 3-15%, or 4-50%, or 4-40%, or 4-30%, or 4-20%, or 4-15%, or 5-50%, or 5-40%, or 5-30%, or 5-20%, or 5-15% of the total weight of the resin-forming reactants. In additional aspects of the invention, for each of these percentage ranges, tri- or higher-functional phenols may constitute 0-100%, or any of the ranges set forth above, of the phenolic compound. In a preferred embodiment, the phenolic component contributes about 5-15 wt % of the total weight of the reactants used to form the resin.

In various aspects of the invention, when tri- or higher-functional phenols constitutes 100% of the phenolic compound present in the reactant components, the fatty acid constitutes at least 5 wt %, or at least 10 wt %, or at least 15 wt %, or at least 20 wt %, or at least 25 wt %, or at least 30 wt %, or at least 40 wt % of the total weight of the reactants used to form the resin.

In other aspects, when tri- or higher-functional phenols constitutes at 30 least 85 wt % of the phenolic compound present among the reactant components, the fatty acid constitutes at least 5 wt %, or at least 10 wt %, or at least 15 wt %, or at least 20 wt %, or at least 25 wt %, or at least 30 wt %, or at least 40 wt % of the total weight of the reactants used to form the resin.

In other aspects, when tri- or higher-functional phenols constitutes at least BOwt % of the phenolic compound present among the reactant components, the fatty acid constitutes at least 5 wt %, or at least 10 wt %, or at least 15 wt %, or at least 20 wt %, or at least 25 wt %, or at least 30 wt %, or at least 40 wt % of the total weight of the reactants used to form the resin.

In other aspects, when tri- or higher-functional phenols constitutes at least 60 wt % of the phenolic compound present among the reactant components, the fatty acid constitutes at least 5 wt %, or at least 10 wt %, or at least 15 wt %, or at least 20 wt %, or at least 25 wt %, or at least 30 wt %, or at least 40 wt % of the total weight of the reactants used to form the resin.

In other aspects, when tri- or higher-functional phenols constitutes at least 55 wt % of the phenolic compound present among the reactant components, the fatty acid constitutes at least 5 wt %, or at least 1 Owt %, or at least 15 wt %, or at least 20 wt %, or at least 25 wt %, or at least 30 wt %, or at least 40 wt % of the total weight of the reactants used to form the resin.

In other aspects, when tri- or higher-functional phenols constitutes at least 35 wt % of the phenolic compound present among the reactant components, the fatty acid constitutes at least 5 wt %, or at least 10 wt %, or at least 15 wt %, or at least 20 wt %, or at least 25 wt %, or at least 30 wt %, or at least 40 wt % of the total weight of the reactants used to form the resin.

In other aspects, when tri- or higher-functional phenols constitutes at least 25 wt % of the phenolic compound present among the reactant components, the fatty acid constitutes at least 5 wt %, or at least 1 Owt %, or at least 15 wt %, or at least 20 wt %, or at least 25 wt %, or at least 30 wt %, or at least 40 wt % of the total weight of the reactants used to form the resin.

I n other aspects, tri- and higher-functional phenols constitute 5-15% 30 of the total weight of the resin-forming reactants when fatty acid constitutes 5-25% 31 of the total weight of the resin-forming reactants. In other aspects, tri- and higher-functional phenols constitute 7.5-10% of the total weight of the resin-forming reactants when fatty acid constitutes 5-25% of the total weight of the resin-forming reactants. In other aspects, tri- and higher-functional phenols constitute 5-15% of the total weight of the resin-forming reactants when fatty acid constitutes 10-20% of the total weight of the resin-forming reactants. In other aspects, tri- and higher-functional phenols constitute 7.5-12.5% of the total weight of the resin-forming reactants when fatty acid constitutes 10-20% of the total weight of the resinforming reactants.

In each of these many aspects, the invention optionally provides that Monomer constitutes 100%, or 90%, or 80%, or 70%, or 60%, or 50%, or 40%, or 30%, or 20%, or 10% of the total weight of the fatty acid.

4. Aldehyde

The aldehyde of the present invention is reactive with resin acid and phenol, to produce crosslinked resinous adducts. Exemplary aldehydes of the present invention include, without limitation, formaldehyde, paraformaldehyde, acetaldehyde, glyceraldehyde, butyraldehyde, isobutyraldehyde, benzaldehyde, furfural, and glyoxal.

In one aspect, the resins of the invention are prepared from formaldehyde (chemical formula $CH_2O$) or a reactive equivalent thereof. Since formaldehyde is a gas at room temperature and ambient pressure, it is somewhat difficult to work with in a laboratory or commercial setting. Accordingly, use of a reactive equivalent thereof, such as a formaldehyde-generating compound in either liquid or solid form, is a preferred manner to introduce formaldehyde into a chemical reaction. For example, formaldehyde may be dissolved in water, where it forms "formalin," of chemical formula $HO(CH2OO)nH$, where n is roughly 2. Formalins having both 36 wt % and 50 wt % formaldehyde activity are commercially available, and may be used in the practice of this invention.

A preferred reactive equivalent of formaldehyde is paraformaldehyde, which is a solid, water-free oligomer or polymer of formaldehyde. Paraformaldehyde has the chemical formula $HO(CH2O)nH$ wherein n is on the order of 20 to 100. Paraformaldehyde is commercially available from many sources, including Celanese (Dallas, Tex.). Bulk paraformaldehyde has an aldehyde equivalent weight of roughly 91% of the weight of paraformaldehyde. Other, less preferred sources of formaldehyde include trioxane and hexamethylenetetramine. Trioxane and hexamethylenetetramine are less preferred because their use necessitates special equipment and handling conditions in order to release formaldehyde activity from these chemicals.

In various aspects of the present invention, aldehyde is up to 40%, or up to 30%, or up to 20%, or up to 5%, or 2-40%, or 2-30%, or 2-20%, or 2-15%, or 3-40%, or 3-30%, or 3-20%, or 3-15%. or 4-40%, or 4-30%. or 4-20%, or 4-15%, of the total weight of the reactants used to from the resin. Paraformaldehyde (CAS #30525-89-4) is a preferred aldehyde to be used as a resin-forming reactant, and it is preferably used at about 4-12 wt % of the resin-forming components. The term "formaldehyde" is used herein for convenience to include formaldehyde and reactive equivalents thereof, e.g., paraformaldehyde and formalin.

5. Phenolic Resin

In an optional aspect, the phenolic compound having at least three aldehyde-reactive sites is pre-reacted with the aldehyde, so as to provide a so-called phenolic resin. Thus, the present invention provides that phenolic compound and aldehyde may be added to the resin-forming reaction mixture in the form of a phenolic resin, rather than, or in addition to, the two individual reactants.

The phenolic resin useful in one aspect of the present invention will necessarily be prepared, at least in part, from phenolic compound having at least three reactive sites, i.e., phenolic compound having at least three hydrogens located at ortho or para positions relative to a hydroxyl group directly bonded to an aromatic ring. However, phenolic compound having at least three reactive sites need not be the only phenolic compound used to prepare the phenolic resin. When other phenolic compounds are utilized to prepare the phenolic resin, then phenolic compound having at least three reactive sites provides, in various aspects of the invention, at least 10%, or at least 20%, or at least 30%, or at least 40%, or at least 50%. or at least 60%, or at least 70%, or at least 80%, or at least 90%, of the total weight of phenolic compound used to form the phenolic resin.

In general, the phenolic resin may be prepared from reactants in addition to phenolic compound and aldehyde. For example, polymerizable monomers may be included among the reactants, where styrene and divinyl benzene are exemplary polymerizable monomers. In addition, ethers of phenolic compounds may be used.

The phenolic resin may be of either the resole or novolak form. These forms of phenolic resin are well known in the art. See, e.g., Chemistry of Phenolic Resins, R. W. Martin, Chapter 5, Wiley and Sons, New York, 1956. For example, phenolic compound (e.g., monofunctional phenolic compound, difunctional phenolic compound, trifunctional phenolic compound, etc.) and aldehyde may be combined in the presence of a reaction-promoting compound or catalyst. Known reaction promoting compounds are of two types, (i) an alkali or alkaline earth hydroxide or oxide such as sodium hydroxide, potassium, hydroxide, calcium, hydroxide, barium hydroxide, calcium oxide and the like; or (ii) an amine compound. Suitable amine compounds include primary, secondary and tertiary amines having up to about 10 carbon atoms such as ammonia, hydrazine, methylamine, ethylamine, dimethylamine, trimethylamine, ethylenediamine, hexamethylenetetramine, aniline, cyclohexylamine, benzylamine. ethanolamine, and the like. When the amine type compound is employed as the reactionpromoting compound it will become incorporated into the product compositions. The reaction-promoting compound is present in the reaction mixture at a concentration of from 0.01 to 1 mole, preferably from 0.01 to 0.2 mole, per mole of phenol moiety. When trifunctional or greater phenolic compound is used in combination with a phenolic compound that is not trifunctional or greater, then so34 called mixed resoles and novolaks may be prepared and utilized in the present invention.

S. Optional Reactants

One or more additional reactants may be included in the reaction5 forming mixture, where exemplary optional reactants are discussed below.

1. Polyol

In an optional aspect, the reactants used to form a resin of the present invention further comprise polyol. Polyols of the present invention are reactive with acidic moieties via standard esterification reactions, and are reactive with ester moieties via standard transester[fication reactions, to produce crosslinked resinous adducts. Exemplary polyols include, without limitation, alkylene glycol (such as ethylene glycol and propylene glycol), polyalkylene glycol (such as polyethylene glycol and polypropylene glycol), alkylene triol (such as glycerol, trimethylolethane, and trimethylolpropane), tetrafunctional alcohols such as pentaerythritol, pentafunctional alcohols such as dimerized trimethylolpropane, or hexafunctional alcohols such as dimerized pentaerythritol, where a preferred polyol of the present invention is pentaerythritol.

When polyor is desirably included as a component in a resin-forming reaction, one option is to provide the polyol via a polyester of the polyol and fatty acid. The polyester, upon transesterification with other reactants, provides not only some or all of the polyol, but also provides some or all of the fatty acid. Accordingly, the polyol may be introduced to the reaction mixture via an ester of the polyol. Likewise, the fatty acid may be introduced to the reaction mixture via an ester of the fatty acid. In one embodiment of the invention, polyester is utilized as a reaction component to provide both polyol and fatty acid. In this embodiment of the invention, the polyester is preferably but not limited to a triglyceride, e.g., a vegetable oil.

In addition, the rosin may be esterified prior to being utilized in the resin-forming reaction. If the ester is made from a volatile alcohol, e.g., methanol, then the volatile alcohol will, to a large extent, vaporize under the reaction conditions and be removed from the reaction. However, when the alcohol is a high boiling polyoJ, e.g., glycerin or pentaerythritol, then the polyol will become a component of the product resin.
In various optional aspects of the present invention, polyol (optionally incorporated into a polyester form) is up to 25%, or up to 20%, or up to 15%, or up to 10%, or 1-25%. or 1-20%, or 1-15%, or 1-10%, or 2-25%, or 2-20%, or 2-15%, 10 or 2-10%, or 3-25%, or 3-20%. or 3-15%. or 3-10%, or 4-25%. or 4-20%, or 4-15%, or 4-10% of the total weight of the reactants used to form the resin.

2. a,(3-0lefinicalfy Unsaturated Carbonyl Compound

In another optional aspect, the reactants used to form a resin of the present invention further comprise a,13-olefinically unsaturated carbonyl compound. The a,13-olefinicalJy unsaturated carbonyl compound of the present invention has an olefinic unsaturation adjacent to the carbon atom of a carbonyl group, i.e., has the —C=C—C(=O)— arrangement of carbon and oxygen atoms. The a,[3-olefinically unsaturated carbonyl compound may be reacted with resin acids, rosin and/or fatty acid to form adducts. When the a,[3-olefinically unsaturated carbonyl compound is maleic anhydride, the adduct between rosin and maleic acid is known as maleated rosin. When the a,[3-olefinically unsaturated carbonyl compound is fumaric acid, or an ester of fumaric acid, then the corresponding adduct formed between rosin and fumaric acid or a fumarate is known as fumarated rosin.

Suitable a,13-olefinically unsaturated carbonyl compounds include maleic anhydride, fumaric acid, mono($C_1$-$C_{12}$alkyl)ester of fumaric acid, di($C_1$-$C_{12}$alkyl)ester of fumaric acid, acrylic acid, $C_1$-$C_{12}$alkyl ester of acrylic acid, methacrylic acid, $C_1$-$C_{12}$aJkyl ester of methacrylic acid, itaconic acid, and C1-C,2alkyl ester of itaconic acid. Maleic anhydride, fumaric acid and esters of fumaric acid are preferred a,[3-olefinically unsaturated carbonyl compounds, with maleic anhydride being most preferred.

Typically, when a,~-olefinicaHy unsaturated carbonyl compound is included among the resin-forming reactants. then polyol will also be present among the reactants. However, the converse is not necessarily true, that is, polyol is often included among the resin-forming reactants even though a.(3-olefinically unsaturated carbonyl compound is not included among the reactants. Accordingly, in one aspect of the invention, both a,[3-olefinically unsaturated carbonyl compound and polyol are included among the resin-forming reactants, where in a preferred embodiment the polyol includes pentaerythritol. However. in another aspect, polyol is included among the reactants but a,[3-olefinically unsaturated carbonyl compound is not included among the reactants.

In various optional aspects of the present invention, a,l3-olefinically unsaturated carbonyl compound is up to 15%, or up to 10%, or up to 8%. or up to 5%, orO.1-15%, orO.1-10%, orO.1-8%, orO.1-5%. orO.5-15%, orO.5-10%, or 0.58%. or 0.5-5%. or 1-15%, or 1-10%, or 1-8%, or 1-5% of the total weight of the resin-forming reactants. When it is present, the a.l3-olefinically unsaturated carbonyl compound is preferably maleic anhydride, and it is preferably utilized at a concentration of about 2-4 wt % of the total weight of the resin-forming reactants.
The presence of maleic anhydride or other a,l3-olefinically unsaturated carbonyl compound among the resin-forming reactants tends to increase the softening point of the product resin.

3. Alkaline Metal Salt

An alkaline metal salt is preferably included among the resin-forming reactants as a catalyst for the phenol-aldehyde polymerization. When it functions only as a catalyst, the metal salt is preferably present at a concentration of less than 5 wt % based on the total weight of the reactants. However, the metal salt may also, or alternatively, react with the rosin so as to form resinate, where the term "resin ate" refers to a rosin (which is a carboxylic acid-containing material) in the form of a salt, i.e., a carboxylic acid salt. Thus, in one aspect of the resin composition of the present invention, alkaline metal salt is combined with rosin, which reacts with the carboxylic acid moiety present in the resin acid components of rosin to produce metal carboxylate functionalities. Such treatment renders the resulting resinate composition readily soluble in organic solvent, and also increases the melting point of the rosin. Thus, the metal salt may also become an important component of the resin-forming mixture.

In the present invention, the alkaline metal salt preferably has a cation selected from Group IIA or Group liB of the Periodic Table. The alkaline metal salt is preferably divalent, i.e., carries a charge of +2. Rosin salts of divalent cations of zinc, magnesium, and calcium have particularly good pigment wetting properties, and are preferred in the resinates of the present invention. More preferably, the cation of the alkaline metal salt is divalent magnesium cation. Said salts may be, e.g., the acetate, carbonate, bicarbonate, formate, hydroxide, oxalate or oxide of a metal. Magnesium salts (including without limitation, magnesium oxide and magnesium hydroxide) are further preferred.

In various aspects of the present invention, alkaline metal salt is up to about 10%, or 8%, or 5%, or 4%, or 3%, or 2%, or 1%, or 0.5% of the total weight of the resin composition. A preferred metal salt for catalytic purposes is magnesium oxide, which may be used at a concentration of less than 1 wt %. A preferred salt for resin-forming purposes is calcium oxide, which may be used at a concentration of about 4 wt %. The metal salt is preferably introduced into the reaction mixture in the form of a slurry, that is, a mixture of metal salt and solvent, preferably a hydrocarbon solvent (e.g., xylene) optionally with fatty acid present.

4. Hydrocarbon-~9 ntainin . . . 9 Resins

Resins prepared in whole or part from a hydrocarbon monomer may optionally be included among the reactants and/or may be admixed with a resin of the present invention. The term "hydrocarbon monomer" refers to a monomer formed entirety from carbon and hydrogen. Exemplary hydrocarbon monomers are provided below, and include cyclopentadiene, dicyclopentadiene, styrene, and alpha-olefin. The following provides some discussion of these monomers and the resins prepared therefrom.

a. C5 Resins

Aliphatic C5 hydrocarbon resins can be prepared by cationic polymerization of a cracked petroleum feed containing C5 and C6 paraffins, oletins, and diolefins, collectively referred to as "C5 monomers". 1,3-Pentadiene is a commonly used component for making C5 resins, where 1,3-pentadiene may be in admixture with one or more similarly reactive hydrocarbons such as cyclopentene, pentene, 2-methyJ-2-butene, 2-methyl-2-pentene, cyclopentadiene, and dicyclopentadiene. The polymerizations are catalyzed using Friedel-Crafts polymerization catalysts such as Lewis acids, e.g., boron trifluoride or complexes thereof (e.g., etherates), aluminum trichloride, or alkyl aluminum chlorides.

b. DCPD resins

Hydrocarbon-containing resins may be prepared by the polymerization of cyclopentadiene or dicyclopentadiene (DCPD). The DCPD resin may be prepared from monomers in addition to cyclopentadiene and/or dicyclopentadiene, e.g., hydrocarbon monomers such as ethylene, propylene, styrene, a-methyl styrene, indene, 1,3-pentadiene, isobutylene, isoprene, 1-butene, 2-methyl-2-butene, 1-pentene, 1-hexene, 1-octene, piperylene, isoprene, limonene, a-pinene, j3-pinene, butadiene and vinyl toluene. The cyclopentadiene and/or dicyclopentadiene may optionally be reacted with olefinic monomers that contain oxygen, e.g., methacrylic acid, acrylic acid, and esters thereof. Methods to prepare DCPD resins are well known in the art, see, e.g., U.S. Pat. Nos. 5,693,731; 5,691,432; 5,587,007; and 5,410,004.

c. C9 Resins

Aromatic C9 hydrocarbon resins can be prepared by cationic polymerization of aromatic C8. C9, and/or C10 unsaturated monomers derived from petroleum distillates resulting from naphtha cracking and are referred to as "C9 monomers". Exemplary C9 monomers include styrene, a-methyl styrene, ~methyl styrene, vinyl toluene, indene, dicyclopentadiene, divinylbenzene, and other alkyl substituted derivatives of these compounds. The polymerizations are catalyzed using Friedel-Crafts polymerization catalysts. The resins may be hydrogenated to provide hydrogenated C9 resins. These C9 resins may be included as a component in the reaction mixture to prepare a resin of the present invention, and/or these C9 resins may be admixed with a resin of the present invention in the preparation of a varnish or ink. C9 resins are commercially available from many vendors, and the preparation of C9 resins is well known in the art.

d. Styrenic Resins

Hydrocarbon resins can be prepared by cationic po[ymerization of styrene-based monomers such as styrene, a-methyl styrene, vinyl toluene, and other alkyl substituted styrenes using Friedel-Crafts polymerization catalysts such as Lewis acids. These styrenic resins may be included as a component in the reaction mixture to prepare a resin of the present invention, and/or these styrenic resins may be admixed with a resin of the present invention in the preparation of a varnish or ink. Styrene resins are commercially available from many vendors and their preparation is weir known.

e. Terpene Resins

Terpene resin may function as a hydrocarbon resin, and be included within the reaction mixture used to form the resin of the present invention, or be admixed with the resin of the present invention. Generally, terpene resins are somewhat expensive, and for this reason they are not a preferred component.

Alpha-pinene, beta-pinene, dipentene and limonene are four terpenes commonly used to prepare terpene resins. In the preparation of a terpene resin, some coreactive non-terpenic monomer may be included, e.g., styrene, p-t-butyl styrene or vinyl toluene. Terpene resins of this type are well known and commercially available.

In general, hydrocarbon monomer-containing resins can be either included as a component of the reactants used to prepare an ink resin of the present invention, or they can be admixed with an ink resin of the present invention. In either event, in optional aspects of the invention, the hydrocarbon monomer-containing resin will constitute 5%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95% of the total weight of the ink resin.

5. Solvent

One or more inert solvents may be included with, i.e., be in admixture with, the reactants used to form a resin of the invention. However, solvent is not construed to be a "component" of the reaction mixture, since it does not participate in the resin-forming reaction. Nevertheless, it may be convenient to include one or more solvents in the reaction vessel, where hydrocarbons, e.g., xylenes, are an exemplary solvent.

C. Sources of Resin Acid and Fatty Acid

Resin acids are commercially available from many suppliers. In essentially all cases, suppliers of resin acid obtain the resin acid from trees, most commonly pine trees. There are many different processes for obtaining resin acid from trees, where these different processes provide not only various mixtures of resin acids, but also various mixtures of resin acids in combination with various other materials found in pine trees, particularly fatty acid, terpenes, lignin and pitch.

For instance, a suitable source of resin acid for the present invention is one of the by-products produced by the Kraft papermaking process. Briefly, according to this well-known process, pine chips are fed into a digester along with an alkaline cooking liquid, and the mixture is maintained at elevated temperature.

The resulting product includes the salts of resin acids and fatty acids, which are skimmed from the top of the digester, where the skimming is known as tall oil soap. Upon acidification, tall oil soap yields crude tall oil (CTO).

CTO contains fatty acids and resin acids, in roughly equal amounts, along with some other reactants. While the fatty acids and resin acids are both monocarboxylic acids having 18-20 carbon atoms, these materials have different chemical structures, and thus the physical and chemical properties of fatty acids and resin acids are quite different. In order to take advantage of these different properties, distillation processes are commonly performed on CTO, to thereby obtain purified resin acids (commonly called rosin) and purified fatty acids (commonly called tall oil fatty acids, or TOFA). In addition to rosin and fatty acids, CTO distillation yields one or more head cuts, a pitch residue, and a material called distilled tall oil (OTO). These materials are obtained by the following, more precisely described process.

The CTO is heated to distill all volatile materials, which include the components of heads, rosin, TOFA, and some material that ultimately ends up as OTO, yielding residue that is known as pitch. The distillate is then re-heated to distirl a volatile fraction including the components of heads, TOFA, and further material that ultimately ends up as DTO, yielding residue called rosin, or tall oil rosin (TOR). The distillate from this process is then heated once again, to distill a heads fraction and a fatty acids fraction (TOFA), yielding residue known as distilled tall oil (OTO).

Any of these mixtures may be the source of the resin acid and/or fatty acid of the present invention. In a preferred embodiment, the resin acid 25 comes from rosin. In another preferred embodiment, the fatty acid comes from TOFA.

As mentioned above, OTO may be used in the practice of the present invention. While the exact composition of DTO is not completely known, it is clear that DTO is not the same as crude tall oil, pitch, rosin or tall oil fatty acid, nor is it 30 simply a blend of these materials. In fact, although DTO is distilled from CTO, the 42 extensive heating employed during the distillations described above provides that OTO contains materials that are not even present in CTO. A general characterization of OTO is made difficult because it depends on the composition of the precursor eTO, which itself will vary depending on the identity of the trees from which the CTO was obtained and even the time of year that the trees were cut. Furthermore, there is also variability among CTO fractionators as far as the temperatures and pressures that are used during each distillation step and the duration of each step. These are important parameters because OTO is, to a large extent, the result of thermal isomerization, degradation and polymerization processes, and the degree to which each of these processes will occur is dependent on the fractionation conditions.

Roughly, OTO contains 20-45 weight percent of a fatty acid-like component, 15-35 weight percent of a rosin-like component, and 10-35 weight percent of a "less-volatile" component that has not been clearly traced to either resin or fatty acids. While rosin contains predominately abietane resin acids, DTO typically contains a predominant amount of pimarane resin acids. In a typical OTO, resin acids of the pimaranes and isopimaranes constitute the majority of the resin acids present in the OTO. Also typically, resin acids of the abietane family constitute less than 10 weight percent of the OTO. Indeed, the total weight of the abietic acid, neoabietic acid and palustric acid is typically less than 10 weight percent of the total weight of the OTO, and more typically is less than 5 weight percent of the total weight of the OTO. Typically, resin acids of the pimarane and isopimarane families constitute at least 50 wt %, and more typically at least about 60 wt % of the resin acids present in the OTO. OTO may provide some or all of the resin acids or fatty acids in preparing a resin of the present invention.

As mentioned above, rosin is a preferred source for resin acids. In general, rosin is a well-known, commercially available material. In terms of its chemical structure, it is mainly a mixture of $C_{20}$, tricyclic fused-ring, monocarboxylic acids, i.e., resin acids. Rosin can be obtained from many sources, and can have a wide range of purities. For example, wood rosin is obtained from *Pinus* 43 stumps after harvesting the stumps, chipping the stumps into small chips, extracting the chips with hexane or higher-boiling paraffins, and distilling the hexane or paraffin and fatty acids to yield wood rosin. Gum rosin is the name given to rosin that is obtained after scoring a pine tree, collecting the exudate sap, and then distilling away the volatile components and most of the fatty acids. As discussed above, the Kraft wood pulping process, also known as the sulfate pulping process, produces tall oil rosin (TOR).

For clarity, it will be noted that as the term is used herein, "rosin" refers to rosin from any source, including tall oil rosin (by-product from wood pulping process), gum rosin (obtained by scoring trees and collecting/refining the exudate) and wood rosin (obtained from pine stumps by extractive and/or distillative methods). The term "rosin" also includes treated rosin, where treated rosin refers to rosin that has been subjected to disproportionation and/or hydrogenation conditions. The term "rosin" also includes dimerized rosin. The term "rosin" also includes compositions that include resin acids in mixture with non resin acids, e.g., Indonesian gum rosin contains resin acids but also contains about 8-10% of a polycyclic dicarboxylic acid. Indonesian gum rosin is a rosin, and a source of resin acid, for the present invention.

Each of disproportionated, hydrogenated and dimerized rosin, as well as other rosin/resin acid derivatives and reaction products, are well known in the art and many have been described previously herein. The term "natural rosin" will be used herein to refer to untreated rosin, that is, rosin that is known commercially as "rosin", and has, for example, CAS #8052-10-9 (Tall Oil Rosin) or CAS #805009-7 (Gum Rosin). In a preferred aspect of the present invention, natural rosin provides the source of all or most of the resin acids used in the inventive process and resins.

Rosin is typically characterized by its acid number, and rosins having acid numbers ranging from about 160 to about 180 are preferred, but not necessarily utilized, in the practice of the present invention. Typically, the acid content of rosin is due to the presence of resin adds and fatty acids. Although rosin manufacturers typically seek to provide rosin having little or no fatty acid, in practice it is quite expensive to remove all of the fatty acid from rosin. Accordingly, the rosin used in the present invention may contain some fatty acid. However, fatty acid is typically a minor component of rosin, and typically the rosin contains less than 10 wt %, and more typically less than 5 wt % fatty acid. In one aspect, the rosin used in the present invention is tall oil rosin that has undergone distillation so as to have less than about 5 weight percent tall oil fatty acids. A preferred rosin is available commercially from Arizona Chemical Company, Jacksonville, Fla., under the SYLVAROS® trademark. Because rosin contains little or no fatty acid, rosin alone typically cannot provide sufficient fatty acid for the practice of the present invention.

Optionally, the rosin can be characterized in terms that describe the source of at least 90% of the total weight of the rosin. For example, in one aspect of the invention, tall oil rosin provides at least 90% of the weight of the rosin used 15 to prepare a resin of the invention. In one aspect, a mixture of gum rosin and tall oil rosin is used to form the resin of the invention.

Fatty acid may be obtained from either natural sources or by synthetic means. Fatty acids may be obtained from plants (e.g., corn, safflower, and other vegetable oil) and animals (e.g., fish oil, lard). Fatty acid may also be obtained via the oxidation of petroleum-derived materials, e.g., the oxidation of short polyethylene molecules. Genetically-modified plants and animals, which may be considered either natural sources or synthetic sources, may also yield fatty acids. Either synthetic or natural fatty acid may be used as a reactant component in the present invention. In one aspect of the invention, the fatty acid is vegetable-derived, i.e., comes from vegetable oil. In another aspect, the fatty acid is tree-derived, e.g., tall oil fatty acid (TOFA). A preferred fatty acid has been assigned CAS #68955-98-6.

In one aspect of the present invention, the fatty acid component is, or includes, Monomer. While Monomer is well known in the art, for additional clarity 30 the production of a preferred Monomer of the invention will be briefly summarized, 45 starting with the wood pulping process. The digestion of wood to make pulp leads to the formation of black liquor. Black liquor is composed of, among other things, rosin soap and fatty acid soap. Acidification of these soaps followed by fractionation yields rosin and fatty acid as two of the components. The rosin obtained by this process is known as tall oil rosin (TOR) and the fatty acid obtained by this process is known as tall oil fatty acid (TOFA). TOFA is composed mainly of $C_{16-18}$ carboxylic acids, which are largely unsaturated in their hydrocarbon chain structure. Exemplary tall oil fatty acids include unsaturated acids such as oleic acid, oleic acid isomers, linoleic acid, and linoleic acid isomers, as well as small percentages of saturated fatty acids such as stearic acid.

Due to its high content of unsaturated fatty acid, TOFA may be, and commonly is, subjected to acidic clay catalyzed polymerization. In this polymerization process, which is typically conducted at high temperatures, the olefinic fatty acids undergo intermolecular addition reactions, by, e.g., the ene-reaction, so as to form polymerized fatty acid. The mechanism of this reaction is complex and incompletely understood at the present time. However, for purposes of the present invention it will suffice to note that the product of this polymerization process comprises, in large part, dimerized fatty acid and a unique mixture of monomeric fatty acids. This polymerization product is commonly (in commercial settings) subjected to distillation in order to provide a fraction highly enriched in dimerized fatty acid, which is commonly known in the art as "dimer acid" or "dimer fatty acid". This distillation process will also provide a fraction that is highly enriched in the monomeric fatty acids, where this fraction is commonly known in the art as "monomer" or "monomer acid" or "monomer fatty acid," and will be referred to herein as Monomer (With a capital M).

Monomer is a unique composition. Whereas the natural source derived TOFA largely consists of linear $C_{18}$ unsaturated carboxylic acids, principally oleic and linoleic acids, Monomer contains relatively small amounts of oleic and linoleic acids, and instead contains significant amounts of branched and cyclic $C_{18}$ acids, both saturated and unsaturated, as well as elaidic acid. For 46 example, a typical commercially-available Monomer contains ca. 30% C18 branched chain fatty acid (including saturated and unsaturated fatty acids) and 10% C18 cyclic chain fatty acid. The more diverse and significantly branched composition of Monomer results from the thermal catalytic processing carried out on TOFA by the polymerization process just described.

While a preferred Monomer used in the present invention is derived from TOFA, unsaturated fatty acids from any other source may likewise be subjected to a polymerization process that yields drmer fatty acid and a residual mixture of monomeric fatty acid known as Monomer. For instance, unsaturated fatty acids from vegetable oils may be subjected to a dimerization process, from which dimer acid and Monomer may be obtained. Likewise, unsaturated fatty acids may be produced by microorganisms, e.g., bacteria, and from animal products/byproducts (e.g., fish oils).

Monomer has been assigned CAS Registry Number 68955-98-6. A suitable Monomer for the practice of the present invention is CENTURY® MO-6 specialty fatty acid, as available from Arizona Chemical Company (Jacksonville, Fla.). This product is a light-colored semi-solid, having an acid number of 180, a saponification number of 187, an iodine number of 75, and a viscosity of 35 centistokes at 40° C. In a preferred aspect of the present invention, the fatty acid of the resin-forming composition is Monomer.

The art recognizes that the reaction of Monomer with other chemical substances yields unique, identifiable derivative substances that are chemically different from corresponding TOFA derivatives. In fact, it has been surprisingly found that resins of the present invention comprising Monomer exhibit properties of ink binder performance superior to those demonstrated by resins comprising TOFA.

Optionally, all of the fatty acid utilized in the process is Monomer, In other words, 100% of the fatty acid is Monomer. However, in other aspects of the invention, less than all of the fatty acid is provided by Monomer. For instance, in 30 one aspect, 95% of the fatty acid is Monomer. The following are various optional 47 means for characterizing the fatty acid according to the present invention: 100% of the fatty acid is Monomer; at least 95% of the fatty acid is Monomer; at least 90% of the fatty acid is Monomer; at least 85% of the fatty acid is Monomer; at least 80% of the fatty acid is Monomer; at least 75% of the fatty acid is Monomer; at least 70% of the fatty acid is Monomer; at least 65% of the fatty acid is Monomer; at least 60% of the fatty acid is Monomer; at least 55% of the fatty acid is Monomer; at least 50% of the fatty acid is Monomer; at least 45% of the fatty acid is Monomer; at least 40% of the fatty acid is Monomer; at least 35% of the fatty acid is Monomer; at least 30% of the fatty acid is Monomer; at least 25% of the fatty acid is Monomer; at least 20% of the fatty acid is Monomer; at least 15% of the fatty acid is Monomer; at least 10% of the fatty acid is Monomer. The percent values are weight percentages based on the total weight of fatty acid.

In a very surprising discovery, the present inventor has found that enhanced aliphatic solubility can be obtained by using branched-chain fatty acids and/or cyclic-chain fatty acids (in lieu of the standard linear-chain fatty acids that are found in TOFA) in the preparation of a rosin-phenolic resin. Thus, in a preferred embodiment, Monomer is used as a resin-forming component. Optionally, the fatty acid is a mixture of Monomer and TOFA. In another optional embodiment, the fatty acid is entirely TOFA. In another optional embodiment, the fatty acid is, in part TOFA, and is, in part, a non-TOFA fatty acid, e.g., a vegetable oil-derived fatty acid.

D. Process of Manufacture

The present invention provides a resin produced by a process as described herein. The process includes reacting resin acid, fatty acid, at least trifunctional phenolic compound, and aldehyde. These reactants, and possibly optional reactants, are reacted together at elevated temperature so as to form a resin. In order for the reactants to undergo a resin-forming reaction, combinations of the reactants must be exposed to an elevated temperature, for example, one or more temperatures in the range of about 80-300° C. At these elevated temperatures, the reactants undergo covalent bond-forming reactions with other reactants, so that high molecular weight products, i.e., a resin, forms.

There are different orders in which the reactants may be charged to a reaction vessel. For example, each of the reactants may be combined together in a single reaction vessel, and the combination taken to elevated temperature so that the reactants react with one another to form a resin of the invention. This approach may be termed the "one-pot" reaction process. Alternatively, two or more (but less than all) reactants may be combined in a single reaction vessel, and this combination taken to elevated temperature so that the reactants react with one another to form an intermediate reaction product. Then other reactants are reacted with the intermediate reaction product, where these "other reactants" may be added individually to the reaction vessel, or two or more of them may be prereacted with each other before the pre-reacted reaction product is added to the reaction mixture.

For example, the resin acid (e.g., rosin) and fatty acid may be combined and heated, during which process these two reactants will form a fluid mixture. The resulting reaction mixture can then be combined with the other reactants (e.g., phenolic compound and/or aldehyde and/or a,13-olefinicafly unsaturated carbonyl compound and/or polyol, as well as other optional reactants such as alkaline metal salt), and the complete admixture formed either instantaneously, or in stepwise fashion, to allow intermediate reactions to occur with minimal interference. The resulting reaction mixture may alternatively be combined with a reaction product of two or more of phenolic compound, aldehyde, a,13-olefinically unsaturated carbonyl compound and polyol, in addition to further ingredients. To complete the reaction process, the reaction mixture is taken to elevated temperature, typically but not limited to, between about 150° C. and about 300° C., preferably 180° C. to 250° C., under either normal (atmospheric) pressure or reduced pressure as may be achieved, e.g., using a vacuum source. The reduced pressure is conveniently employed to remove water and'other volatile materials from the reaction mixture.

As other exemplary orders of reaction, a molten mixture of rosin and fatty acid is formed, and then maleic anhydride is added at about 180° C. and the mixture is maintained at this temperature until essentially all of the maleic anhydride has been consumed. Alternatively, rosin is heated with maleic anhydride to about 180° C. until all of the maleic has been consumed, and then fatty acid is added. After either process, polyol is added and then the mixture is cooled to about 11 DOC, at which time phenol and aldehyde, along with metal salt, is added. The temperature is raised to about 225° C. to complete the formation of the resin.

Thus, the invention provides that the reactants may be reacted with one another in any order, at temperatures within the range of 80-3 DO° C., to obtain a resin of the invention. The present invention also provides that after reacting together reactants in a reaction mixture, an additional amount of one or more of said reactants may be added to said reaction mixture and further reacted together, a procedure commonly done in commercial resin production. It should be recognized that the same reactants (in terms of quantity and identity) may form resins with different properties, depending on the precise manner in which the reactants are reacted together. However, determining these properties is well within the skill of the ordinary artisan.

Elevated reaction temperatures are selected in view of the following points. The reaction temperature must be high enough that the contents of the reaction vessel are sufficiently fluid to allow those contents to be stirred. Higher temperatures are generally preferred for reasons of economy, in order to provide a faster rate of reaction. When a solvent is used, a fluid state may be achieved at a relatively lower temperature. The reaction temperature should not be so great that the reactants boil out of the reaction vessel. Nor should the temperature be so great that decomposition of the reactants or reaction products should occur. The term "elevated" is used to indicate that standard room temperature, i.e., ca. 23° C., will not be hot enough to provide the fluid state needed for the neat reactants. At a minimum, the elevated reaction temperature should be about 8 Goe, and is 50 preferably at least 100° e. A lower temperature may be utilized if a solvent is included within the reaction vessel.

The resin-forming reaction mixture may, and typically will contain water; furthermore, the resin-forming reaction generates water as a byproduct of the covalent bonds that are formed between the reactants. In order to drive the reaction toward completion, this water should be removed from the reaction or product mixture. In the absence of vacuum or azeotrope formation, a reaction temperature of at least $1_{000e}$ is needed in order to distill water away from the reactants. Thus, at least during the initial stage(s) of resinate or ester formation, the reaction temperature is desirably set to about 100-190° C. While a higher initial reaction temperature may be used, the consequence may be water generation at a rate that is much greater than water removal may be conveniently accomplished.

In order to drive the reaction to completion, removal of water may be enhanced through addition of an organic solvent that forms a IOW-boiling azeotrope with water, and/or the addition of a vacuum on the reaction vessel. To provide a low-boiling azeotrope, an organic solvent that forms an azeotrope with water, e.g., a solvent such as but not limited to toluene or xylene, can be added to the reaction vessel, and then removed by distillation, under normal pressure. However, in one aspect of the invention, azeotropic distillation is not used to remove water from the resin.

The reactants are maintained at about 120-300° C. until the reaction is. considered finished. Reaction progress is conveniently monitored by periodically taking samples of the reaction mixture and measuring one or more relevant properties of the sample. For example, initially the acid number of the reaction mixture may be as high as about 300. The acid number will gradually fall as the resin-forming reaction proceeds. Melting point (softening point), melt Viscosity, solution viscosity and/or cloud point measurements may also be made periodically to monitor reaction progress.

The amounts of the various reactants are preferably selected so that 30 the reaction mixture does not form a gel during the heating process. This is particularly important when the reaction mixture contains multifunctional reactants, e.g., maleic anhydride and pentaerythritol. However, gelling can also occur when only resin acid, fatty acid, aldehyde and phenolic compound are used to form the resin. A preferred property of a resin of the present invention is that it is not a gel, and it is not in admixture with gel. In a preferred aspect, a resin of the present invention may be dissolved at elevated temperature in xylene at a 1 D wt % concentration, and upon cooling, a bright, clear solution results. This is indicative of a resin that does not contain any gel.

The Examples contained herein provide several formulations that do not gel. For example, a mixture of about 60 wt % gum rosin, ca. 15 wt % phenol, ca. 15 wt % paraformaldehyde (91%), ca. 10 wt % Monomer, and a trace (ca. O.5 wt %) magnesium oxide can be used to provide a fluid (when molten), rather than a gelled, resin. As another example, a mixture of about 45 wt % gum rosin, ca. 20 wt % tall oil rosin, ca. 8 wt % phenol, ca. 5 wt % paraformaldehyde (91%), ca. 10 wt % Monomer, ca. 2 wt % maleic anhydride, ca. 1 Dwt % pentaerythritol, and a trace (ca. 0.1 wt %) magnesium oxide can be used to provide a fluid (when molten), rather than a gelled, resin.

A preferred reaction mixture contains rosin, which contributes 3590 wt %, fatty acid, which contributes 10-30 wt %, and aldehyde+phenolic compound that is at least trifunctional with respect of aldehyde reactivity, either as individual monomers or as pre-formed phenolic resin, which contributes 10-30 wt %, where the phenolic compound is preferably phenol, each wt % value being based on the total weight of the rosin, fatty acid, phenolic compound and aldehyde present within the reactants.

Another preferred set of reactants is 35-70 wt % rosin, 5-40 wt % fatty acid, 5-25 wt % phenolic resin (or the total weight of phenolic compound and aldehyde is within this range), and 5-15 wt % polyol (preferably pentaerythritol), and some, but less than about 5 wt % a,f3-olefinically unsaturated carbonyl compound (preferably maleic anhydride), based on the total weight of these listed reactants, where in various embodiments of the invention at least 50%, or at least 60%, or at 52 least 70%, or at least 80%, or at least 90%, or at least 95%, or all of the phenolic compound is phenol or other phenolic compound that is at least trifunctional with respect to aldehyde reactivity.

Another preferred set of reactants is 40-65 wt % rosin, 10-30 wt % fatty acid, 10-20 wt % phenolic resin (or the total weight of phenolic compound and aldehyde is within this range), and 5-15 wt % polyol (preferably pentaerythritol), and some, but less than about 5 wt % a,~-olefinically unsaturated carbonyl compound (preferably maleic anhydride), based on the total weight of these listed reactants, where in various embodiments of the invention at least 50%, or at least 60%, or at least 70%, or at least 80%, or at least 90%, or at least 95%, or all of the phenolic compound is phenol or other phenolic compound that is at least trifunctional with respect to aldehyde reactivity_

Another preferred set of reactants is 45-60 wt % rosin, 10-30 wt % fatty acid, 10-20 wt % phenolic resin (or the total weight of phenol and aldehyde is within this range), and 5-15 wt % polyol (preferably penta erythritol), and some, but less than about 5 wt % a,~-olefinically unsaturated carbonyl compound (preferably maleic anhydride), based on the total weight of these listed reactants, where in various embodiments of the invention at least 50%, or at least 60%, or at least 70%, or at least 80%, or at least 90%, or at least 95%, or all of the phenolic compound is phenol or other phenolic compound that is at least trifunctional with respect to aldehyde reactivity_

Another preferred set of reactants is 30-65 wt % rosin, 5-35 wt % fatty acid, 5-25 wt % phenolic resin (or the total weight of phenol and aldehyde is within this range), and 5-15 wt % polyol (preferably pentaerythritol), based on the total weight of these listed reactants, where in various embodiments of the invention at least 50%, or at least 60%, or at least 70%, or at least 80%, or at least 90%, or at least 95%, or all of the phenolic compound is phenol or other phenolic compound that is at least trifunctional with respect to aldehyde reactivity. Within these ranges, exemplary specific formulations are disclosed 30 herein. In one preferred embodiment, the at least trifunctional phenolic compound 53 constitutes at least 25 wt % of the total weight of the phenolic compounds, or other minimum values and ranges as disclosed elsewhere herein.

If a reaction mixture does gel to an undesirable extent, then an adjustment should be made in the amount of one or more of the reactants. To this end, a statistical design of experiments may be utilized to optimize a formulation for a particular end-use, e.g., gravure vs. lithographic ink resin. Since the resins of the invention preferably have a relatively high molecular weight, and accordingly have a relatively high solution viscosity, successful resin formulations are often close to those resin formulations that yield an undesirable amount of gelled resin.

Thus, in one aspect, the present invention provides a resin produced by a process, where the process includes reacting the following reactants: resin acid, fatty acid, at least trifunctional phenolic compound and aldehyde. In another aspect, the reactants include a,l3-olefinically unsaturated carbonyl compound. In another aspect, the reactants included polyol. In another aspect, the reactants include both aJ3-0lefinically unsaturated carbonyl compound and polyol. The reactants are reacted at elevated temperature so as to form a resin, preferably a gel-free resin.

In another aspect, the present invention provides a resin produced by a process, where the process includes reacting the following reactants: resin acid, fatty acid, phenolic compound that is at least trifunctional, aldehyde, and polyol. These reactants are reacted at elevated temperature so as to form a resin. Another exemplary product is formed by the process of reacting resin acid, fatty acid and trifunctional phenolic compound at elevated temperature, optionally with addition of a reaction catalyst, followed by addition of paraformaldehyde, followed by the addition of polyol. However, other orders of combination of the reactants may also be employed to prepare a product of the present invention. Also, as stated above, rosin may serve as the source of resin acid.

In another aspect, the present invention provides a resin produced by a process, where the process includes reacting the following reactants: resin acid, 30 fatty acid, phenolic compound that is at least trifunctional, aldehyde, a,l3-olefinically 54 unsaturated carbonyl compound, and polyol. These reactants are reacted at elevated temperature so as to form a resin. An exemplary product is formed by the process of reacting resin acid, fatty acid and at least trifunctional phenol at elevated temperature, optionally with addition of a reaction catalyst, followed by addition of paraformaldehyde, followed by the addition of a,~-olefinically unsaturated carbonyl compound, followed by the addition of polyol. However, other orders of combination of the reactants may also be employed to prepare a product of the present invention, as described below.

In a preferred aspect, the process for preparing a resin of the present 10 invention comprises the ordered steps of:

a) heating rosin in a reaction vessel, optionally at about 140-180° C., optionally in admixture with fatty acid and phenolic compound that is at least trifunctional, until a homogeneous molten liquid is formed;

b) further charging the reaction vessel with, if not present, fatty acid and the phenolic compound that is at least trifunctional, then allowing the reaction mixture to react, optionally at about 100-140° C., optionally for up to about 60 minutes;

c) further charging the reaction vessel with aldehyde and metal catalyst, then allowing the reaction mixture to react, optionally at about 100-180° C., 20 optionally for up to about 300 minutes;

d) further optionally charging the reaction vessel with a,~-olefinically unsaturated carbonyl compound, then allowing the reaction mixture to react, optionally at about 120-250° C., optionally for up to about 150 minutes;

e) further optionally charging the reaction vessel with polyol, then allowing the reaction mixture to react, optionally at about 120-310° C., optionally for up to about 48 hours.

Overall, it typically takes at least about 4 hours to prepare a resin from resin acid, fatty acid, phenoric compound having a functionality of at least three, aldehyde and metal oxide where a temperature of about 110° C. is used when the reactants are being combined, and a temperature of about 210° C. is used 55 when the reactants are being reacted together to form the resin. Resin formation occurs when the reactants react with one another so as to create higher molecular weight materials, where longer reaction times typically provide for a greater amount of high molecular weight material, and also provide for resin of relatively higher molecular weight, i.e., the average molecular weight of the product mixture (resin) generally increases with increased reaction time. When polyol, a,J3olefinically unsaturated carbonyl compound, and/or other optional reactants are utilized, then the reaction period must typically be extended to allow time for these optional components to react. With the exception of the metal oxide catalyst, each of the reaction components participates in the resin-forming reaction, i.e., each of the reactants contributes carbon atoms to the final high molecular weight resin. When the metal oxide is present at relatively high concentration, e.g., 4-8 wt %, it may be considered to contribute to the structure of the overall resin. When used for the purpose of resinate formation, the metal salt or oxide is typically added to the reaction mixture at about the same time as the polyol is added.

In an optional aspect, the process for preparing a resin further comprises charging the reaction vessel with alkaline metal salt wherein the cation of said salt is divalent. The salt may be added after formation of the homogeneous molten liquid of resin acid and fatty acid. Thus, the present invention provides that for each of the processes and reaction mixture described herein, metal salt may be added to the reactants to provide a resin of the present invention. In addition, some small amount of anti-float agent may be added to the reaction mixture, typically an amount of less than 0.1 wt %.

E. Resin Properties

The resins of the present invention may be characterized by their properties, which include acid number, melting point, molecular weight distribution and solubility. These properties are routinely measured for ink resins, and thus one skilled in the art is very familiar with techniques to measure these properties.

Nevertheless, a brief description of suitable techniques to measure certain of these properties is provided here.

Acid number is measured by dissolving a known weight of resin (e.g., 1 gram) into an organic solvent (e.g., toluene is a typical solvent, however a 1:2 ratio weight ratio of isopropanol toluene may be used if toluene alone does not dissolve the resin), and then titrating a measured amount of methanolic potassium hydroxide (e.g., 0.1 N methanol KOH) solution into the resin solution. The titration is complete when a pH of about 7 is attained. This endpoint can be seen by including phenolphthalein in the solution, where the endpoint occurs when a faint pink color persists for at least 15 seconds. The acid number of the resin is equal to the amount of KOH, in mg, which was used in the titration, divided by the weight of resin, in grams, in the sample that was titrated. In other words, acid number is equal to the mg of KOH needed to neutralize 1 gram of sample.

In various optional aspects of the present invention, the acid number of the resin is less than about 70, or less than about 60, or less than about 50, or less than about 40, or less than about 30; or about 1-70, or 1~60, or 1-50, or 1-40, or 1-30, or about 5-70, or 5-60, or 5-50, or 5-40, or 5-30, or 10-70, or 10-60, or 1050, or 10-40, or 10-30, or 15-70, or 15-60, or 15-50, or 15-40, or 15-30. For a resin intended for a lithographic ink formulation, the acid number of the resin is preferably about 10-30, or about 20. When the acid number is greater than about 30-40, then the resin is rather hydrophilic and will tend to absorb and/or hold onto water, where this is often disadvantageous when these resins come into contact with aqueous fountain solutions. When the resin is intended for a gravure ink formulation, the resin preferably has an acid number of about 10-60, or about 45.

In practice, reducing acid number below about 10 is expensive and for this reason is not preferred.

Melting point, which may also be referred to as "softening point," may be measured by the so-called "ring and ball" method, which is the subject of ASTM E28. Alternatively, a softening point value may be obtained using a softening point 30 instrument from Mettler Laboratories (Hightstown, N J, USA). The melting point values described and reported herein were obtained using a Mettler FP90/FP83 HT Cup and Ball apparatus, according to the following procedure: A 2.80 mm bottom orifice sample cup is filled with the molten resin to be tested. The excess resin is removed to give a flat surface. The solid resin should be free of bubbles. The sample cup is placed in the cartridge with the lead ball (3.4±O.2 gram) centered on top of the sample and the cartridge is placed in the furnace. The following conditions are used: start temperature is 20-25° C. below the expected softening point, heating rate of 1.5° C./min. Results are reported in DC. According to this procedure, a resin of the present invention preferably has a softening point in excess of, in various embodiments of the invention, 90° C., or 100° C., or 110° C., or 120° C., or 130° C., or 140° C.; while in various additional embodiments the resin of the present invention has a softening point within a range of: 100-230° C., 110230° C., 120-230° C., 130-230° C., 140-230° C., 100-200° C., 110-200° C., 120-200° C., 130-200° C., 140-200° C., 100-180° C., 110-180° C., 120-180° C., 130-180° C., 140-180° C., 100-160° C., 110-160° C., 120-160° C., 130-160° C., or 140-160° C. A preferred resin for lithographic printing has a softening point of about 105-185° C., while a preferred resin for gravure printing has a softening point of about 135-185° C.

When the softening point of the resin falls below about 100° e, then it becomes difficult to form flakes from the resin, where customers for ink resins often prefer the flaked form of the product. Accordingly, for relatively low softening point resins, it may be convenient to form a solution of the resin, rather than flakes.

A resin of the present invention may be characterized in terms of its molecular weight, where molecular weight is measured according to conventional means using gel permeation chromatography (GPC). GPC analysis may be performed using a Waters model 515 pump (Waters Instruments, Plymouth, Minn., USA; www.wtrs.com), Waters model 717 auto injector and Waters 410 differential refractive index (RI) detector. The components are eluted with a suitable solvent, e.g., tetrahydrofuran (THF) through suitable column(s), e.g., a row of 3 Polymer Labs mixed-B GPC columns (Polymer Laboratories, Amherst, Mass., USA; www.polymerlabs.com). Molecular weight is determined by comparison of retentions times to a column calibrated with polystyrene standards. Under these conditions, a resin of the present invention preferably has a peak molecular weight within the range of, in various embodiments of the invention, 30,000-500,000, or 30,000-400,000, or 30,000-300,000, or 80,000-500,000, or 80,000-400,000, or 80,000-300,000, or 120,000-500,000, or 120,000-400,000, or 120-300,000, or 150,000-500,000, or 150,000-400,000, or 150,000-300,000. A preferred resin of the present invention has a peak molecular weight of about 200,000.

A resin of the invention may be characterized in terms of its solution form. In other words, a solution of the resin in a suitable solvent is prepared, and this solution is characterized in order to evaluate the quality of the resin. The solution may be referred to as a varnish, where the varnish may be used to prepare an ink. The following procedure may be used to prepare a solution (varnish) containing a resin of the present invention, where the varnish itself is an aspect of the present invention. The device used in this procedure is called a 'Thermotronic", and it is available from Testprint, Inc. (Cherry Hill, N J, USA; www.testprint.com).

The resin is crushed under mechanical force, and the crushed resin and a test solvent are weighed into a metal Thermotronic test tube for a total sample size of 50 grams. The varnish is typically prepared at a resin solids concentration of 35-50 wt %, preferably about 45 wt %. The tube is placed in the Thermotronic and a PT-100 temperature probe is inserted. The Thermotronic controllably heats the solution using the following parameters: stirring speed (RPM) 120; heating rate (DC/minute) 35; top temperature (OC) ca. 180-230 C; hold time (minutes) ca. 2-10; cooling rate (OC/minute) 20. Suitable solvents for this purpose include M47, TXIB, ARLO, and N40HT, where M47 is MAGIESOL™ M-47, a "technical white oil," from Magie Brothers, Franklin Park, F L, presently a division of Pennzoil Products Company; TXIB is a plasticizer ester of the chemical name 2,2,4-trimethyl-1,3-pentanediol diisobutyrate sold by Eastman Chemical, Kingsport, T N; ARLO is Alkali Refined Linseed Oil, a commodity chemical; and N40HT is a specific hydrotreated naphthenic petroleum oil {Chemical Abstract 59 Service Registry No. 64742-53-6), where many members of this family of oil are commercially available (see, e.g., San Joaquin Refining Co., Inc. Bakersfield, C A, USA).

Two other suitable solvents are the printing ink distillates known as PKWF® and PRINTOSOL® solvents, both available from Haltermann Products (a subsidiary of the Dow Company, Channelview, T X, USA; www.haltermann.com). PRINTSOL® 6/9 AR is a hydrocarbon solvent having a distillation range at 1,013 kPa according to ISO 3405 or ASTM D 86 of 260-290° C.; a density at 15° C. according to ISO 12185 or ASTM D 4052 of 875 kg/m$^3$: an aromatic content of 50% w/w, an aniline point according to DIN ISO 2977 or ASTM 0611 of 45° C.; a water content according to ASTM D 1133 of 50, and a refractive index according to DtN 51423-2 of 1.490 no$^{20}$; and a pour point according to DIN ISO 3016 or ASTM D 97 of less than −24° C. PKWF® 6/9 is a hydrocarbon solvent having a distillation range at 1,013 kPa according to ISO 3405 or ASTM D 86 of 260-290° C.; a density at 15° C. according to ISO 12185 or ASTM 0 4052 of 830 kg/m$^3$; an aromatic content of 20% wlw, an aniline point according to DIN ISO 2977 or ASTM 0611 of 76° C.; a water content according to ASTM 0 1133 of 27, a refractive index according to DIN 51423-2 of 1.459; and a pour point according to DIN ISO 3016 or ASTM D 97 of −18° C. PKWF 6/9® AF is a hydrocarbon solvent having a distillation range at 1,013 kPa according to ISO 3405 or ASTM 086 of 260-290° C.; a density at 15° C. according to ISO 12185 or ASTM D 4052 of 777 kg/m$^3$; an aromatic content of less than or equal to 1% w/w, an aniline point according to DIN ISO 2977 or ASTM D 611 of 95° C.; a water content according to ASTM 0 1133 of 20, a refractive index according to DIN 51423-2 of 1.435; and a pour point according to DIN ISO 3016 or ASTM D 97 of +12° C.

The solvents may be blended together if desired, e.g. 1:1 M47 and TXIB may be used as the solvent.

F. Inks and Varnishes

The present invention provides solutions of the ink resins of the present invention, including solutions intended to be components of ink formulations, where these later solutions are commonly known as varnishes. Varnishes useful in gravure and lithographic inks may be characterized in terms of their viscosity, tan delta, and cloud point, among other properties known to one of ordinary skill in the art. Varnishes for evaluation purposes, such as for rheological evaluation, may be prepared using the Thermotronic device described above.

Rheology flow measurements can be made on a varnish of the present Invention. This measurement can be performed using a TA Instruments (New Castle, D E, USA; www.tain-st.com) AR-1 OOON rheometer in flow mode at 25° C. using a 4 cm 1° cone set at the geometric gap. A shear rate of 25 s t is applied for 1 minute with 50 measurement points collected. The final measurement point is taken as the flow viscosity and is reported in Pa·s. Under these conditions, a 45 wt % PKWF 6/9 AR solution of a resin of the present invention preferably has a flow viscosity of 0.1 to 450 Pa·s., or 0.5 to 450 Pa·s., or 5 to 450 Pa·s., or 0.1 to 150 Pa·s., or 0.5 to 150 Pa·s., or 5 to 150 Pa·s. In one aspect, a varnish of the solution has a flow viscosity of about 5 to 150 Pa·s. for a resin intended for a lithographic ink. In one aspect, the flow viscosity of the varnish is 20-80 Pa·s.

Rheology frequency sweep measurements may be used to determine the tan delta of a varnish of the present invention. This measurement is made by determining the rheology of the resin solution with a TA Instruments AR 1000N rheometer in oscillation mode at 25° C. using a 4 cm 1° cone set at the geometric gap. A frequency of 1 Hz is applied using a controlled strain of 0.1 O. A temperature sweep is made between 10° C. and 60° e over 15 minutes. Tan Delta, G' (Dynes s-1) and G" (Dynes s 1 are reported at 23° C. A varnish of the present invention may have a tan delta of infinite to 1.3, but more preferably has a tan delta of less than 5, e.g., 1.3-5.

Cloud point may be measured in resin solutions according to standard methods ASTM 097 and SCAN T5:67. The present inventors prefer to determine cloud point using a Chemotronic Cloud Point Tester, available from Testprint, Inc. (Cherry Hill, N.J., USA; www.testprint.com). To measure cloud point, a sample of the resin is mechanically crushed, and 2.0 9 of crushed resin and 18.0 g of the test solvent are weighed into a Chemotronic glass test tube. The tube is then placed in the Chemotronic and a PT-100 temperature probe is inserted. The Chemotronic heats the solution, cools automatically and reports cloud point in degrees C. The following parameters are used for all solvent systems: heat to top temperature of 230° C. at a typical rate of 40° C./min, hold at 230° C. for 2 minutes, then cool at a typical rate of 4 QoC/minute.

Under these conditions, a clear solution is preferably produced at a temperature within the range of 25-180° C. For lithographic printing, the cloud point of the resin may be used as a guide to determine the type of ink the resin is well suited for. For example, jf the cloud point is low, i.e., below about 50° C., e.g., about 25° C., then the resin has very good aliphatic solubility and may be used for pigment wetting. If the cloud point is in the mid-range, i.e., ca. 50-150° C., the resin may be particularly useful in heat set lithographic inks. If the cloud point is high, i.e., over about 150° C., e.g., ca. 180° C., the resin may be particularly useful in inks for sheet fed lithography. For gravure printing, the cloud point of the resin is not particularly critical, and cloud points in the range of 25-180° C. are acceptable, where these cloud points are measured at ca. 10 wt % solids in a solvent. In one aspect, the resin of the present invention is completely soluble at 180° C. in mineral oil at a 10% resin solids concentration.

Particularly when the resin of the present invention is intended for a component of a gravure printing ink, the toluene dilutability of the varnish is an important parameter. Toluene dilution is measured by weighing a known quantity of resinate solution and diluting it with toluene until print viscosity is achieved. Print viscosity is determined using a flow or efflux cup available from a number of manufacturers and standards organizations. Typical cups used include the Shell 62 #2 and DIN 3 mm cups, which both are designed to yield the viscosity of press ready ink at a particular flow time. The known quantity of resinate solution is diluted to a standard flow time (e.g., 18 seconds on a Shell #2 cup or 25 seconds on a 3 mm DIN cup) at a standard temperature (typically 21° C. or 25° C.) and the amount of toluene is recorded in either mLs or grams per sample size used. For example, if 75 mLs of toluene was required to reduce the viscosity of 100 grams of resinate solution to achieve a flow rate of 18 seconds on a Shell #2 cup at 25° C., the toluene dilution would be reported as 75 mLs toluene required to achieve print viscosity on a Shell #2 cup. In one aspect, a resin of the present invention has a dilutability of 60-280 mLs toluene, 3 mm DIN cup at 21° C., starting from 100 grams of a 35% resin solids toluene solution.

Another important property for gravure inks is the viscosity of a solution of the resin. Viscosity is measured on resin or resinate solutions using a Physica Viscolab LC3 viscometer, according to the method of ISO 3219 ("Plastics, polymers, resins in the liquid state or as emulsions of dispersions— Determination of viscosity using a rotational viscometer with defined shear rate"). Measurements obtained by this method are typically reported in units of mPa s. This viscometer is available from Physica Messtechnik GmbH, Stuttgart, Germany (www.physica.de). Using a rotational viscometer, a 35% solid solution of the resin of the present invention preferably has a viscosity of 50-350 mPa-secs.

The present invention also provides an ink suitable for printing, such as gravure or lithographic printing. In gravure printing, a cylinder onto which is engraved or etched the image to be printed is rolled directly into ink and transferred directly to the substrate that accepts the printed image. Gravure printing is a very common commercial mode of printing, and is well known to one skilled in the art. Gravure printing is often used in printing on substrates such as magazine stock, metal foils, plastic films, and paper cartons.

A gravure ink of the present invention contains a resin as disclosed herein, in addition to a solvent, a colorant and optional performance-enhancing additives. The inventive resin can be used alone or in combination with co-resins. Suitable co-resins include commonly known co-resins such as, without limitation, rosin modified maleic and phenolic esters, hydrocarbon resins and alkyds. Owing to the lack of intermediary rollers and/or cylinders utilized in gravure printing, the ink used in gravure printing must be of very low viscosity and finely ground so as to reduce the amount of scratching imparted to the engraved or etched cylinder; yet, because of the relative absence of solvent-sensitive (i.e., rubber-composed) moving parts needed for said printing process, a wide range of solvents are acceptable for use in gravure printing. Suitable solvents include, without limitation, mineral oils, aromatic and ester solvents. Suitable colorants include flushed color, dry pigments and soluble dyes. Additives can include, without limitation, waxes, wetting agents, and plasticizers. In addition to the materials noted above, the ink additionally may contain any number of optional components, where the optional component(s) provide for improvements in the performance of the ink. Ink performance properties include color strength, gloss, scuff resistance, block resistance, misting, open time on press and many other properties.

The resins of the present invention are particularly useful as let down vehicles for gravure inks, e.g., publication gravure inks. Thus, a pigment dispersion may be prepared using a pigment and a solution resinate, where solution resinates are well known, commercially available products currently used for pigment grinding. After the pigment dispersion has reached a desired state, e.g., a desired average pigment particle size, the dispersion is diluted with a letdown vehicle. In addition to diluting the colorant, the letdown vehicle imparts various desirable properties to the ink. Desirable properties include gloss and scuff resistance. The rosin phenolic resin of the present invention, dissolved in a suitable solvent such as toluene, can be used as a component of such a letdown vehicle. The rosin phenolic resin will typically be present at about 30-35% solids in such a vehicle. In one aspect the present invention provides a phenolic resin as described herein, in a varnish form.

Lithographic printing is a process whereby ink is transferred by rolling 30 onto one or several additional cylinders before transferring ink onto the substrate, 64 in contrast to gravure printing, where ink is directly transferred to the substrate. The lithographic printing process is such that ink is run in combination with an aqueous solution (known in the art as a fountain solution), the purpose of the fountain solution being to wet the parts of the substrate that do not receive ink.

Lithographic printing is also a very common commercial mode of printing, used in printing on substrates such as packaging material, and is well known to one of ordinary skill in the art.

Lithographic printing is divided into two major types: sheet-offset, or printing on individual substrate sheets; and web-offset, or printing on continuous rolls of substrate. Each of these two major types is further divided into subclasses based on the mechanism of ink drying. Hence, the properties of a desirable lithographic ink binder are largely dependent on the specific type and subclass of printing employed. Some resin properties commonly desirable for essentially all types of lithographic printing include high melting point, high viscosity, good solubility in high-boiling low-solvency aliphatic solvents, good pigment wetting, and low pigment reactivity.

In one aspect, the resins of the present invention demonstrate selfgelling behavior. In other words, they do not require the presence of metal salt in order to gel a hydrocarbon solvent. Whether a resin is self-gelling can be determined using a viscometer, which can measure the viscoelasticity of a mixture of resin and solvent. In order to determine its viscoelasticity, a solution of resin and mineral oil is prepared by mixing the components for 30 minutes at 180° C. in a weight ratio of resin:mineral oil of 1:1.5. The mineral oil should have a boiling range of 240-270° C. and an aniline point of 72° C. (standard mineral oil PKW F 4/7, supplier: Haltermann). This mixture is cooled to room temperature, and the tan delta of the solution is measured using a viscometer. For instance, an oscillating rotary viscometer (RV 20/CV 100 apparatus from Haake using measuring device (cone) PK 20 at 23'C, a deflection angle of 10°, a frequency sweep of 0.05 to 5 Hz, and an angular velocity range (omega) of 1-10 s−1 gives tan delta value of <5 for a self-gelling resin.

Printing ink may be prepared by adding colorant (e.g., flush color, dry pigment or soluble dyes), additives and additional solvent to a letdown varnish comprising a resinate composition of the present invention. Flush color is a form of pigment where the solvent used during the pigment manufacturing process (water) has been replaced by a hydrocarbon or oil based varnish. Such a varnish can contain the inventive or conventional resins, resinates, or a combination of both. Finished ink may be prepared by adding the flush color and the letdown varnish while mixing at low shear. The mixture can be passed through a bead mill or shot mill to further reduce pigment particle size and improve final ink properties. Soluble dyes can be added with little or no additional energy to impart color to the system. Additional varnish or solvent can be added to adjust tack, flow and viscosity to reach target specifications and then additives are blended in.

The following are some other optional components that may be included in an ink of the present invention. Blown Castor Oil (BCD) may be included at a level of, e.g., 1-3 wt % in order to reduce the water pickup of the ink. Soybean oil (S80) is often used in inks in order to reduce their tack, and to increase the flowability of an ink, where a typical concentration is 1-1 0wt %. Tung oil may be included in an ink formulation at a concentration of about 5-15 wt % in order increase the setting speed of an ink. Tung oil may also increase the hardness of the dried ink. Tung oil, like S80, can also increase the flowability of an ink, and reduce its tack. Alkali Refined Linseed Oil (ARLO) is extracted from the seed of the flax plant, and consists largely of linolenic acid, ARLO can be used for cutting tack and body, increasing flow of overly "short" inks, and to enhance the film integrity of inks that contain metallic driers that can react with ARLO. The addition of Gelled Linseed Oil (GLO) to an ink is a convenient way to reduce the tack of a heavy ink, particularly sheetfed or web offset inks. Each of these oils is a commodity chemical and readily available from many commercial suppliers.

One skilled in the art is familiar with preparing printing inks using either flush color, dry pigment or soluble dyes, and may adopt other procedures for 30 preparing such a printing ink using a resin of the present invention. Accordingly, 66 the following examples provide illustrations of the present invention, and are not a limitation thereon.

The invention is illustrated in more detail by the following examples. In the following examples, chemicals were of reagent grade unless noted otherwise, and were obtained from commercial supply houses such as Aldrich Chemical Co. (Milwaukee, Wis.). SYLVAROS™ 85 tall oil rosin, SYLFAT™ 28 tall oil fatty acid, and CENTURY MO6™ Monomer are available from Arizona Chemical (Jacksonville, Fla.). Chinese gum rosin is available from sources such as BFB Enterprises (Panama City Beach, Fla.). Test oils 6/9 and 6/9 AR are mineral oils available from Haltermann Products (Channelview, T X). When a value is recited such as "45% AR", this refers to a sofution of the resin in 6/9 AR test oil, at 45 wt % solids (100×weight of resin divided by the sum of the weights of the resin and the solvent).

In the Tables, "%" refers to weight percent of a particular reactant based on the total weight of the reactants.

Example 1

Rosin Modified Phenolic Ester

As summarized in TABLE 1, a reaction vessel was charged with Chinese gum rosin, CENTURY MO6™ Monomer, and phenol, and heated to about 150-170° C. After the mixture was molten, the vessel was further charged with magnesium oxide catalyst (dispersed in about 15 grams xylene), and the resulting admixture was cooled to about 11 O° C. The reaction vessel was charged with 91% paraformaldehyde, and the resulting admixture was refluxed at about 120° C. for about 90 minutes, before heating to about 270° C. (@ 35° C./hr) to allow removal of condensed water and drive the reaction to completion.

TABLE 1

Composition Of Rosin Monomer Phenolic Resin

| CAS No. | Component | Weight Percent |
|---|---|---|
| 8050-09-7 | Chinese Gum Rosin | 58.16 |
| 108-95-2 | Phenol | 14.54 |
| 30525-89-4 | Paraformaldehyde, 91% | 15.31 |
| 68955-98-6 | CENTURY MO6 ™ Monomer | 11.63 |
| 1309-48-4 | Magnesium Oxide | 0.36 |
| | Total charge (grams): | 825.36 |
| | Final Softening Point rC): | 155 |
| | Final Acid Number (mg KOHfg): | 56 |

Examples 2-4

Rosin Modified Phenolic Ester

These examples describe the preparation of rosin modified phenolic esters suitable for use in lithographic varnish manufacture, according to the weight percentages indicated in TABLE 2.

A reaction vessel was charged with Chinese gum rosin, tall oil rosin. CENTURY M06 "Monomer, and phenol, and heated to about 150-170° C. After melting the rosin, the vessel was further charged with magnesium oxide catalyst (dispersed in about 10 grams xylene), and the resulting admixture was cooled to about 110° C. The reaction vessel was then further charged with 91% paraformaldehyde, the resulting admixture was allowed to reflux at about 110-120° C. for about 90 minutes, before heating to about 155° C. to allow removal of condensed water. The reaction vessel was then further charged with maleic anhydride, and the resulting admixture was heated to 21 DoC. The reaction vessel was then further charged with mono-pentaerythritol, and the resulting admixture was heated to about 270° C., to allow removal of water produced from esterification. The reaction product was sampled hourly at 270° C. for viscosity in mineral oil and cloud point from mineral oil solution. Optionally, the reaction mixture was held at about 150° C. overnight, before reheating the mixture to 270° C. and proceeding with sampling as above. Upon reaching the desired level of viscosity and solids, the reaction mixture was cooled to about 250° C. and discharged.

TABLE 2

Composition Of Rosin Modified Phenolic Ester

| | | Weight Percent | | |
|---|---|---|---|---|
| CAS No. | Component | Ex. 2 | Ex. 3 | Ex. 4 |
| 8050-09-7 | Chinese Gum Rosin | 43.85 | 47.48 | 44.2 |
| 8052-10-6 | SYLVAROSTM 85 Tall Oil Rosin | 18.79 | 20.35 | 19.0 |
| 108-95-2 | Phenol | 8.50 | 5.52 | 8.6 |
| 30525-89-4 | Paraformaldehyde, 91% | 6.94 | 4.50 | 7.0 |
| 68955-98-6 | CENTURY MO6 ™ Monomer | 11.33 | 7.01 | 10.6 |
| 1309-48-4 | Magnesium Oxide | 0.15 | 0.11 | 0.1 |
| 108-31-6 | Maleic Anhydride | 1.22 | 3.78 | 1.2 |
| 115-77-5 | Mono-Pentaerythritol | 9.22 | 11.26 | 9.2 |
| | Total charge (grams): | 2472 | 1141.6 | 1225 |
| | Final Softening Point CC): | 130 | 150 | 138 |
| | Final Viscosity 45% AR (Pa,s): | 37.9 | 32.2 | 42.2 |
| | Rheology Tan delta, 23° C., 45% AR: | 5.186 | n.d. | 5.522 |
| | Final Cloud Point CC): | 109 | 126 | 119 |
| | Finaf Acid Number (mg KOH/g): | 19.3 | 20.3 | 22.3 |

Following essentially the same procedure as set forth in Examples 14, the reactants of TABLE 3 where charged to a reaction vessel.

| | Weight | Weight % |
|---|---|---|
| Gum Rosin | 487.8 g | 43.1% |
| Tall Oil Rosin | 209 g | 18.5% |
| Monomer | 144 9 | 12.7% |
| Phenol | 94.5 9 | 8.4% |
| MgO | 1.6 g | 0.2% |
| Paraform | 86.2 | 7.6% |
| Maleic Anhydride | 7.8 9 | 0.7% |
| Penta erythritol | 100.5 g | 8.8% |
| Total Charge | 1,131.4 g | 100% |

The resin of Example 5 had a cloud point as measured at 10 wt % in test oil of 105° C., a viscosity at 23° C. as measured for a 45 wt % solution in test oil of 10 26.2 Pascal, and an acid value of 20.6.

Following essentially the same procedure as set forth in Examples 14, the reactants of TABLE 4 were charged to a reaction vessel. The resulting resins had final values for viscosity, rheology and cloud point as indicated in TABLE 4. The data in Table 4 show that both viscosity and cloud point increase with increasing phenol level.

|  | Example Number | | |
|---|---|---|---|
|  | 6 | 7 | 8 |
| Chinese Gum Rosin (%) | 46 | 45.5 | 45 |
| SYLVAROS™ 85 Tall Oil Rosin (%) | 20 | 19.5 | 19 |
| M06 (%) | 10 | 10 | 10 |
| Phenol (%) | 7.5 | 8 | 8.5 |
| Paraformaldehyde (%) | 7.8 | 8.3 | 8.8 |
| F/P | 3 | 3 | 3 |
| Pentaerythritol (%) | 8.6 | 8.5 | 8.4 |
| OH excess | 10 | 10 | 10 |
| Magnesium Oxide (%) | 0.2 | 0.2 | 0.2 |
| Maleic Anhydride (%) | 0 | 0 | 0 |
| Cloud Point 10% 6/9 (OC) | 81 | 114 | 126 |
| Viscosity 35% 6/9 AR Blend (Pa · s) | 0.68 | 2.43 | 6.3 |
| Tan delta, 35% 6/9 AR Blend, 23° C. | infinite | 126.9 | 11.23 |
| Tan delta, 35% 6/9 AR Blend, 41° C. | infinite | Infinite | infinite |
| Tan delta, 35% 6/9 AR Blend, 60° C. | infinite | Infinite | infinite |

Following essentially the same procedure as set forth in Examples 1-4, the reactants of TABLE 5 were charged to a reaction vessel. The resulting resins had final values for viscosity, rheology and cloud point as indicated in TABLE 5. Relative to TABLE 4, the higher phenol levels used in Examples 9-11 provided resins that yielded higher solution Viscosity and lower tan deltas. A higher Monomer level was used to maintain cloud point at the higher viscosity level. These resins are useful, for example, in sheetfed applications.

|  | Example Number | | |
|---|---|---|---|
|  | 9 | 10 | 11 |
| Chinese Gum Rosin (%) | 37 | 37 | 37 |
| SYLVAROS™ 85 Tall Oil Rosin (%) | 16 | 16 | 16 |
| M06 (%) | 20 | 20 | 20 |
| Phenol (%) | 9.5 | 9.5 | 9.5 |
| Paraformaldehyde (%) | 8.4 | 8.4 | 8.4 |
| F/P | 2.5 | 2.5 | 2.5 |
| Pentaerythritol (%) | 8.3 | 8.5 | 8.7 |
| OH excess | 10 | 10 | 10 |
| Magnesium Oxide (%) | 0.2 | 0.2 | 0.2 |
| Maleic Anhydride (%) | 0 | 0.25 | 0.5 |
| Cloud Point 10% 6/9 (DC) | 82 | 112 | 119 |
| Viscosity 35% 6/9 AR Blend (Pa · s) | 13.7 | 20.4 | 33.3 |
| Tan delta, 35% 6/9 AR Blend, 23° C. | 2.767 | 2.758 | 1.926 |
| Tan delta, 35% 6/9 AR Blend, 41° C. | 11.57 | 12.29 | 4.077 |
| Tan delta, 35% 6/9 AR Blend, 60° C. | infinite | Infinite | 45.58 |

Following essentially the same procedure as set forth in Examples 1-4, the reactants of TABLE 6 were charged to a reaction vessel. The resulting resins had final values for Viscosity, rheology and cloud point as indicated in TABLE 6. Relative to the Examples of Table 5, the reactions described in TABLE 6 utilize a higher Monomer level to yie~d resins with cloud points below 10° C. These resins are useful, for example, in heatset applications and pigment wetting applications.

|  | Example Number | | |
|---|---|---|---|
|  | 12 | 13 | 14 |
| Chinese Gum Rosin (%) | 30 | 30 | 30 |
| SYLVAROS™ 85 Tall Oil Rosin (%) | 13 | 13 | 13 |
| M06 (%) | 30 | 30 | 30 |
| Phenol (%) | 9.5 | 9.5 | 9.5 |
| Formaldehyde (%) | 8 | 8 | 8 |
| FIP | 2.5 | 2.5 | 2.5 |
| Pentaerythritol (%) | 8.4 | 8.5 | 8.7 |
| OH excess | 10 | 10 | 10 |
| Magnesium Oxide (%) | 0.2 | 0.2 | 0.2 |
| Maleic Anhydride (%) | 0 | 0.25 | 0.5 |
| Cloud Point 10% 6/9 (OC) | 42 | 47 | 63 |
| Viscosity 35% 6/9 AR Blend (Pa · s) | 3.7 | 3.8 | 9.4 |
| Tan delta, 35% 6/9 AR Blend, 23° C. |  |  | 2.416 |
| Tan delta, 35% 6/9 AR Blend, 41° C. |  |  | 5.262 |
| Tan delta, 35% 6/9 AR Blend, 60° C. |  |  | infinite |

Following essentially the same procedure as set forth in Examples 1-4, the reactants of TABLE 7 were charged to a reaction vessel. The resulting resins had final values for viscosity, rheology, and cloud point as indicated in TABLE 7. Relative to Table 6, the reactions described in Table 7 had higher phenol and Monomer loadings to yield usable viscosities at even lower could points. These resins are suitable in, for example, heatset and pigment wetting applications.

|  | Example Number | | |
|---|---|---|---|
|  | 15 | 16 | 17 |
| Chinese Gum Rosin (%) | 26 | 26 | 26 |
| SYLVAROS™ 85 Tall Oil Rosin (%) | 11 | 11 | 11 |
| M06 (%) | 35 | 35 | 35 |
| Phenol (%) | 10 | 10.5 | 11 |
| Paraformaldehyde (%) | 8.7 | 9.0 | 9.5 |
| F/P | 2.5 | 2.5 | 2.5 |
| Pentaerythr~tol (%) | 8 | 8 | 8 |
| OH excess | 10 | 10 | 10 |
| Magnesium Oxide (%) | 0.2 | 0.2 | 0.2 |
| Maleic Anhydride (%) | 0 | 0 | 0 |
| Cloud Point 10% 6/9 (DC) | 35 | 45 | 101 |
| Viscosity 35% 6/9 AR Blend (Pa.s) | 1.2 | 4.6 | 11.9 |
| Tan delta, 35% 6/9 AR Blend, 23° C. |  | 1.931 | 1.901 |
| iTan delta, 35% 6/9 AR Blend, 41° C. |  | 3.058 | 3.693 |
| ITan delta, 35% 6/9 AR |  | 7.734 | ~30.79 |

Following essentially the same procedure as set forth in Examples 1-4, the reactants of TABLE 8 were charged to a reaction vessel. Each of these sets of reactants provided a gelled product within the indicated time. Gellation occurred because one or more of the functional components (phenol, paraformaldehyde or maleic anhydride) was present at too high of a concentration in the reaction vessel.

A resin of the present invention preferably is not a gelled resin, and is not in admixture with gelled resin. In a preferred aspect, a resin of the present invention may be dissolved at elevated temperature in xylene at a 10 wt % concentration, and upon cooling, a bright, clear solution results. This is indicative of a resin that does not contain any gel.

|  | Weight Percent | | | | | | |
|---|---|---|---|---|---|---|---|
| Component | Ex. 18 | Ex. 19 | Ex. 20 | Ex. 21 | Ex. 22 | EX. 23 | EX. 24 |
| Chinese Gum Rosin | 37.31 | 30.21 | 30.30 | 27.20 | 27.09 | 27.04 | 29.11 |
| SYLVAROS™ 85 Tall Oil Rosin | 15.99 | 12.95 | 12.99 | 11.66 | 11.61 | 11.59 | 12.47 |
| Phenol | 9.87 | 9.92 | 9.56 | 9.23 | 9.19 | 9.17 | 10.89 |
| Paraformaldehyde, 91% | 8.64 | 8.68 | 8.40 | 8.10 | 8.07 | 8.05 | 9.53 |
| CENTURY MO6 ™ Monomer | 19.74 | 29.76 | 30.20 | 34.01 | 33.87 | 33.79 | 29.70 |
| Magnesium Oxide | 0.20 | 0.20 | 0.20 | 0.19 | 0.19 | 0.19 | 0.20 |
| Maleic Anhydride | — | — | — | 0.97 | 1.45 | 1.45 | — |
| Pentaerythritol | 8.27 | 8.28 | 8.36 | 8.63 | 8.52 | 8.71 | 8.10 |
| Sampling time when gel discovered: | 7 hrs | 4 hrs | 5 hrs | 3 hrs | 2 hrs | 2 hrs | 4 hrs |

Following essentially the same procedure as set forth in Examples 1-4, the reactants of TABLE 9 were charged to a reaction vessel. Each of these sets of reactants provided a gelled product within the indicated time. As with Examples 18-24, gellation occurred because one or more of the functional components (phenol, paraformaldehyde or maleic anhydride) was present at too high of a concentration in the reaction vessel. As indicated in the previous set of Examples, a resin of the present invention preferably is not a gelled resin, and is not in admixture with gelled resin.

|  | Weight Percent | | | | | | | | | |
|---|---|---|---|---|---|---|---|---|---|---|
| Component | EX. 25 | Ex. 26 | EX. 27 | EX. 28 | Ex. 29 | Ex. 30 | EX. 31 | EX. 32 | EX. 33 | EX. 34 |
| Chinese Gum Rosin | 50.00 | 43.04 | 36.09 | 29.13 | 22.07 | 32.76 | 25.78 | 18.80 | 22.87 | 15.67 |
| SYLVAROS™ 85 Tall Oil Rosin | 21.43 | 18.45 | 15.47 | 12.49 | 9.47 | 14.04 | 11.05 | 8.06 | 9.80 | 6.72 |
| Phenol | 9.92 | 9.92 | 9.91 | 9.91 | 9.93 | 12.45 | 12.44 | 12.44 | 9.40 | 9.45 |
| Paraformaldehyde, 91% | 10.44 | 10.43 | 10.43 | 10.43 | 10.45 | 13.09 | 13.09 | 13.08 | 9.89 | 9.94 |
| CENTURY MO6 ™ Monomer | — | 9.92 | 19.83 | 29.73 | 39.73 | 19.91 | 29.86 | 39.80 | 39.60 | 49.75 |
| Magnesium Oxide | 0.20 | 0.20 | 0.20 | 0.20 | 0.20 | 0.20 | 0.20 | 0.20 | 0.20 | 0.20 |
| Penta erythritol | 8.02 | 8.05 | 8.08 | 8.12 | 8.15 | 7.56 | 7.59 | 7.62 | 8.25 | 8.27 |
| Sampling time when gel discovered: | 4 hrs | 4 hrs | 4 hrs | 4 hrs | 2 hrs | <2 hrs | <2 hrs | <2 hrs | 4 hrs | 2 hrs |

Examples 37-50

Rosin Modified Phenolic Ester

Following essentially the same procedure as set forth in Examples 1-4. the reactants of TABLE 10 were charged to a reaction vessel. The resulting resins had final values for viscosity, rheology. cloud point, molecular weight, softening point, and acid number as indicated in TABLE 10. The reaction conditions of Table 10 illustrate, for example, the effect of including maleic anhydride among the reactants.

|  | Weight Percent | | | | | | |
|---|---|---|---|---|---|---|---|
| Component | Ex. 37 | Ex. 38 | Ex. 39 | Ex. 40 | Ex. 41 | Ex. 42 | Ex. 43 |
| Chinese Gum Rosin | 37.36 | 37.20 | 30.30 | 30.03 | 30.21 | 23.25 | 29.75 |
| SYLVAROS™ 85 Tall Oil Rosin | 16.01 | 15.94 | 12.99 | 12.87 | 12.95 | 9.97 | 12.75 |

-continued

| | | | | | | | |
|---|---|---|---|---|---|---|---|
| Phenol | 9.57 | 9.52 | 9.56 | 9.48 | 9.92 | 9.92 | 10.38 |
| Parafonnaldehyde, 91% | 8.40 | 8.36 | 8.40 | 8.32 | 8.68 | 8.86 | 9.08 |
| CENTURY M06™¹ Monomer | 20.14 | 20.05 | 30.20 | 29.93 | 29.76 | 39.67 | 29.65 |
| Magnesium Oxide | 0.20 | 0.20 | 0.20 | 0.20 | 0.20 | 0.20 | 0.20 |
| Maleic Anhydride | — | 0.25 | — | 0.50 | — | — | — |
| Pentaerythritol | 8.32 | 8.47 | 8.36 | 8.66 | 8.28 | 8.32 | 8.20 |
| Mn (average, amu): | 2209 | 1629 | 1950 | 1612 | n.d. | n.d. | n.d. |
| Mw (weight-average, amu): | 369722 | 240487 | 389453 | 178458 | n.d. | n.d. | n.d. |
| Final Acid Number (mg KOH/q): | n.d. | 24.8 | n.d. | n.d. | 20.4 | 22.8 | n.d. |
| Softening pt (OC) | 137 | 131 | 117 | 124 | 119 | 169 | 127 |
| VISCOSITY (Pa·s) | | | | | | | |
| AR Blend (35%/45%): | 13.7/ n.d. | 20.4/ n.d. | 3.7/ 12.7 | 9.4/ n.d. | 7.5/ 23.9 | 5.5/ n.d. | 8.5/ 27.8 |
| 50% M47: | n.d. | n.d. | n.d. | n.d. | 132.8 | n.d. | 133.0 |
| CLOUD POINT rC) | | | | | | | |
| 10% 6/9: | 82 | 112 | 42 | 63 | 53 | 36 | 71 |
| 10% 6/9 AF: | n.d. | n.d. | n.d. | n.d. | n.d. | 168 | 210 |
| 10% 6/9 AFN: | 162 | n.d. | 108 | 162 | 131 | n.d. | 159 |
| RHEOLOGY TAN DELTA (35% AR Blend) | | | | | | | |
| 23° C.: | 2.767 | 2.758 | n.d. | 2.416 | 2.209 | 1.770 | 2.221 |
| 41"C: | 11.57 | 12.29 i | n.d. | 5.262 | 4.516 | 2.445 | 4.267 |
| 60"C: | infinite | infinite | n.d. | infinite | 52.68 | 3.937 | 27.84 |

| | Weight Percent | | | | | | |
|---|---|---|---|---|---|---|---|
| Component | Ex. 44 | Ex. 45 | Ex. 46 | Ex. 47 | Ex. 48 | Ex. 49 | Ex. 50 |
| Chinese Gum Rosin | 22.82 | 26.77 | 26.44 | 25.64 | 30.08 | 29.95 | 29.62 |
| SYLVAROS™ 85 Tall Oil Rosin | 9.78 | 11.47 | 11.33 | 10.99 | 12.89 | 12.83 | 12.69 |
| Phenol | 10.37 | 9.91 | 10.33 | 10.89 | 9.88 | 9.83 | 10.33 |
| Parafonnaldehyde, 91% | 9.08 | 8.67 | 9.04 | 9.53 | 8.64 | 8.61 | 9.04 |
| CENTURY M06™¹ Monomer | 39.52 | 34.68 | 34.43 | 34.64 | 29.63 | 29.50 | 29.52 |
| Magnesium Oxide | 0.20 | 0.20 | 0.20 | 0.20 | 0.20 | 0.20 | 0.20 |
| Maleic Anhydride | — | — | — | — | 0.25 | 0.49 | 0.25 |
| Pentaerythritol | 8.23 | 8.31 | 8.22 | 8.12 | 8.44 | 8.59 | 8.36 |
| Mn (average, amu): | n.d. | n.d. | n.d. | n.d. | n.d. | n.d. | n.d. |
| Mw (weight-average, amu): | n.d. | n.d. | n.d. | n.d. | n.d. | n.d. | n.d. |
| Final Acid Number (mg KOH/g): | n.d. | n.d. | n.d. | n.d. | 24.2 | 23.2 | n.d. |
| Softening pt (OC) | 148 | 131 | n.d. | 134 | 109 | 167 | 139 |
| VISCOSITY (Pa·s) | | | | | | | |
| AR Blend (35%/45%): | 6.5/ 16.9 | 1.2/ n.d. | 4.6/ n.d. | 11.9/ n.d. | 5.2/ n.d. | 14.3/ n.d. | 19.6/ n.d. |
| 50% M47: | n.d. | 66.4 | n.d. | n.d. | n.d. | n.d. | n.d. |
| CLOUD POINT rC) | | | | | | | |
| 10% 6/9: | 45 | 35 | 45 | 101 | 50 | 67 | 91 |
| 10% 6/9 AF: | 210 | 172 | n.d. | n.d. | n.d. | n.d. | n.d. |
| 10% 6/9 AFN: | 143 | 116 | n.d. | n.d. | n.d. | n.d. | n.d. |
| RHEOLOGY TAN DELTA (35% AR Blend) | | | | | | | |
| 23° C.: | 1.931 | n.d. | 1.931 | 1.901 | 3.00£.1 | 1.389 | 1.544 |
| 41"C: | 3.058 | n.d. | 3.058 | 3.693 | 8.248 | 1.726 | 2.204 |
| 60"C: | 7.734 | n.d. | 7.734 | 30.79 | infinite | 2.254 | 3.971 |

Example 51

Rosin Modified Phenolic Ester

This example describes the preparation of rosin modified phenolic esters suitable for use in publication gravure varnish manufacture, according to the 5 weight percentages indicated in TABLE 11.

A reaction vessel was charged with tall oil rosin, and CENTURY MO6™ Monomer under inert gas sparge. After melting the rosin, the admixture was cooled to about 110° C., and the vessel was further charged with a slurry of magnesium oxide catalyst (dispersed in xylene). The reaction vessel was then further charged with additional xylene (used to collect residual slurry), phenol, polymethylsiloxane, and 91% paraformaldehyde, and the resulting admixture was allowed to reflux at about 110-120° C. for about 2 hours, charging the vessel with additional polymethylsiloxane as needed to reduce foaming. The reaction mixture was then heated to about 210° C. and the reaction vessel was further charged with antifloat liquid and pentaerythritol. The resulting admixture was then heated to about 270° C., to allow removal of water produced from esterification. After reaching 270° C. (or after about 6 hours of heating to a temperature of 270° C.), the reaction product was sampled hourly for viscosity in mineral oil and cloud point from mineral oil solution. Upon reaching the desired level of viscosity and solids, the reaction mixture was cooled to about 250° C. and discharged.

TABLE

Composition Of Rosin Modified Phenolic Ester

| CAS No. | Component | Weight Percent |
|---|---|---|
| 8052-10-6 | SYLVAROSTM 85 Tall Oil Rosin | 52.32 |
| 108-95-2 | Phenol | 9.38 |
| 30525-89-4 | Paraformaldehyde. 91% | 8.23 |
| 68955-98-6 | CENTURY MO6 ™ Monomer | 19.74 |
| 1309-48-4 | Magnesium Oxide (MgO) | 0.20 |
| 1330-20-7 | Xylene for dispersing MgO | 1.22 |
| 1330-20-7 | Xylene for slurry wash | 1.22 |
|  | Polymethylsiloxane (1% in white spirit) | <0.01 |
| 115-77-5 | Troykyd antifloat liquid (AFL) | <0.01 |
|  | Pentaerythritol | 7.68 |
|  | Total charge (kg): | 22200 |
|  | Final Softening Point (DC): | 136 |
|  | Final Viscosity 35% in toluene, mPa · s): | 175 |
|  | Appearance: | Clear |
|  | Final Acid Number (mg KOH/g): | 20 |

This example describes the preparation of rosin modified phenolic esters suitable for use in lithographic varnish manufacture, according to the weight percentages indicated in TABLE 12.

A reaction vessel was charged with gum rosin, tall oil rosin, and CENTURY MO6™ Monomer under inert gas sparge. After melting the rosin, the 10 admixture was cooled to about 110° C., and the vessel was further charged with a slurry of magnesium oxide catalyst (dispersed in xylene). The reaction vessel was then further charged with additional xylene (used to collect residual slurry). phenol. polymethylsiloxane. and 91% paraformaldehyde, and the resulting admixture was allowed to reflux at about 105-120° C. for about 90 minutes, charging the vessel with additional polymethylsiloxane as needed to reduce foaming. The reaction mixture was then heated to about 155° C. and the reaction vessel was further charged with maleic anhydride. The reaction mixture was then heated to about 210° C. and the reaction vessel was further charged with antifloat liquid and pentaerythritol. such that the pentaerythritol was added no sooner than 90 minutes after addition of maleic anhydride. The resulting admixture was then heated to about 270° C., to allow removal of water produced from esterification. After reaching 270° C. (or after about 6 hours of heating to a temperature of 270° C.), the reaction product was sampled hourly for viscosity in mineral oil and cloud point from mineral oil solution. Upon reaching the desired level of viscosity and solids, the reaction mixture was cooled to about 250° C. and discharged.

| CAS No. | Component | Weight Percent |
|---|---|---|
| 8050-09-7 | Chinese gum rosin | 41.55 |
| 8052-10-6 | SYLVAROSTM 85 Tat! Oil Rosin | 17.81 |
| 108-95-2 | Phenol | 8.85 |
| 30525-89-4 | Paraformaldehyde, 91% | 7.45 |
| 68955-98-6 | CENTURY MO6 ™ Monomer | 14.57 |
| 1309-48-4 | Magnesium Oxide (MgO) | 0.14 |
| 108-31-6 | Maleic anhydride | 0.77 |
|  | Polymethylsiloxane (1% in white spirit) | <0.01 |
|  | Troykyd antifloat liquid (AFL) | <0.01 |

-continued

| CAS No. | Component | Weight Percent |
|---|---|---|
| 115-77-5 | Pentaeryt~1 | 8.93 |
|  | Total charge (kg): | 22203 |
|  | Final Softening Point (OC): | 140 |
|  | Final Viscosity 45% AR (Pa · s): | 23 |
|  | Cloud Point (OC): | 96 |
|  | Appearance: | Clear |
|  | Final Acid Number (mg KOH/g): | 19 |

All of the above U.S. patents. U.S. patent application publications, 5 U.S. patent applications, foreign patents, foreign patent applications and nonpatent publications referred to in this specification and/or listed in the Application Data Sheet, are incorporated herein by reference, in their entirety.

From the foregoing it will be appreciated that, although specific embodiments of the invention have been described herein for purposes of illustration, vadous modifications may be made without deviating from the spirit and scope of the invention. Accordingly, the invention is not limited except as by the appended claims.

The invention claimed is:

1. A process for preparing a resin, the process comprising reacting reactants at elevated temperature, the reactants comprising fatty acid, wherein at least 10 wt. % of the fatty acid is monomer fatty acid derived from acidic clay polymerization of tall oil fatty acid (Monomer), resin acid, aldehyde, polyol, polyester and phenolic compound that is at least trifunctional with respect to reactivity with aldehyde, where the phenolic compound that is at least trifunctional constitutes at least 25 wt % of all phenolic compounds used to form the resin.

2. The process of claim 1 wherein phenol constitutes at least 55 wt % of the phenolic compounds.

3. The process of claim 1 wherein 10 wt. % to 100 wt. % of the fatty acid is Monomer.

4. The process of claim 3 wherein at least 25 wt. % of the fatty acid is Monomer.

5. The process of claim 1 wherein the aldehyde constitutes up to 40 wt % of the reactants.

6. The process of claim 5 wherein the aldehyde constitutes 5-15 wt % of the reactants.

7. The process of claim 1 wherein phenolic compound(s) constitute up to 50 wt % of the reactants.

8. The process of claim 7 wherein phenolic compound(s) constitute 5-15 wt % of the reactants.

9. The process of claim 1 wherein the aldehyde comprises formaldehyde.

10. The process of claim 1 wherein the polyol constitutes up to 15 wt % of the components.

11. The process of claim 10 wherein the polyol comprises pentaerythritol.

12. The process of claim 1 wherein the reactants further comprise an α,β-olefinically unsaturated carbonyl compound.

13. The process of claim 12 wherein the α,β-olefinically unsaturated carbonyl compound constitutes up to 8 wt % of the components.

14. The process of claim 13 wherein the α,β-olefinically unsaturated carbonyl compound comprises maleic anhydride.

15. The process of claim 1 wherein the resin is self-gelling in mineral oil at resin:mineral oil weight ratio of 1:1.5.

16. The process of claim 1 wherein the resin is completely soluble in mineral oil at 10% solids at 180° C.

17. The process of claim 1 wherein the resin has a softening point in excess of 120° C.

18. The process of claim 1 wherein a 45 wt % solution of the resin in a hydrocarbon solvent has a flow viscosity at 25° C. of 0.1 to 150 Pascal-seconds.

19. The process of claim 1 wherein the resin is suitable for use as a lithographic ink resin.

20. The process of claim 1 wherein the resin is suitable for use as a gravure ink resin.

21. The process of claim 1 wherein azeotropic distillation is not used to remove water from the resin.

22. The process of claim 1 wherein an inert organic solvent capable of azeotropic distillation of water at the elevated temperature is not used as an entraining agent for azeotropic distillation of water.

23. A varnish comprising a resin prepared by the process of claim 1 and a solvent.

24. A process for preparing a resin, the process comprising reacting reactants at elevated temperature, the reactants comprising resin acid, fatty acid, wherein at least 10 wt. % of the fatty acid consists essentially of monomer fatty acid derived from acidic clay polymerization of tall oil fatty acid (Monomer), aldehyde, and phenolic compound that is at least trifunctional with respect to reactivity with aldehyde, where the Monomer contributes at least 5% of the weight of the listed reactants, and the resin has a softening point of at least 105.degree.C, and wherein the phenolic compound that is at least trifunctional constitutes at least 25 wt % of all phenolic compounds used to form the resin.

25. The process of claim 24 wherein the resin has a softening point of at least 120° C.

26. The process of claim 24 wherein 10 wt. % to 100 wt. % of the fatty acid is Monomer.

27. The process of claim 26 wherein at least 25 wt. % of the fatty acid is Monomer.

28. The process of claim 24 wherein phenolic compound that is at least trifunctional with respect to reactivity with aldehyde constitutes at least 5 wt % of all phenolic compounds present among the reactants.

29. The process of claim 24 wherein phenolic compound that is at least trifunctional with respect to reactivity with aldehyde constitutes at least 10 wt % of all phenolic compounds present among the reactants.

30. A resin prepared by the process of claim 1.

31. The process of claim 3 wherein at least 45 wt. % of the fatty acid is Monomer.

32. The process of claim 3 wherein at least 65 wt. % of the fatty acid is Monomer.

33. The process of claim 3 wherein at least 75 wt. % of the fatty acid is Monomer.

34. The process of claim 26 wherein at least 45 wt. % of the fatty acid is Monomer.

35. The process of claim 26 wherein at least 65 wt. % of the fatty acid is Monomer.

36. The process of claim 26 wherein at least 75 wt. % of the fatty acid is Monomer.

37. A resin prepared the by process of claim 24.

* * * * *